(12) United States Patent
Huang et al.

(10) Patent No.: US 9,106,142 B2
(45) Date of Patent: *Aug. 11, 2015

(54) SYSTEMS AND METHODS OF PRIMARY-SIDE SENSING AND REGULATION FOR FLYBACK POWER CONVERTER WITH HIGH STABILITY

(71) Applicant: ON-BRIGHT ELECTRONICS (SHANGHAI) CO., LTD., Shanghai (CN)

(72) Inventors: Xiaomin Huang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,479

(22) Filed: Sep. 23, 2013

(65) Prior Publication Data
US 2014/0022824 A1 Jan. 23, 2014

Related U.S. Application Data

(63) Continuation of application No. 13/664,932, filed on Oct. 31, 2012, now Pat. No. 8,570,771, which is a continuation of application No. 12/861,147, filed on Aug. 23, 2010, now Pat. No. 8,331,112.

(30) Foreign Application Priority Data

Jul. 13, 2010 (CN) .......................... 2010 1 0233209

(51) Int. Cl.
*H02M 3/335* (2006.01)
*H02H 7/122* (2006.01)
*H02M 1/00* (2007.01)

(52) U.S. Cl.
CPC ...... *H02M 3/33507* (2013.01); *H02M 3/33523* (2013.01); *H02M 2001/0019* (2013.01)

(58) Field of Classification Search
CPC .......... H02M 2001/0019; H02M 1/32; H02M 2001/0032
USPC ............... 363/20, 21.01, 21.16, 21.17, 21.18, 363/56.09, 56.1, 56.11, 95, 97, 131
See application file for complete search history.

(56) References Cited

U.S. PATENT DOCUMENTS 5,999,421 A * 12/1999 Liu ............................ 363/21.15
6,292,376 B1 * 9/2001 Kato .......................... 363/21.09

(Continued)

FOREIGN PATENT DOCUMENTS

TW 200840174 A 10/2008

*Primary Examiner* — Timothy J Dole
*Assistant Examiner* — Yusef Ahmed
(74) *Attorney, Agent, or Firm* — Jones Day

(57) ABSTRACT

System and method for regulating an output voltage of a power conversion system. The system includes an error amplifier coupled to a capacitor. The error amplifier is configured to receive a reference voltage, a first voltage, and an adjustment current and to generate a compensation voltage with the capacitor. The first voltage is associated with a feedback voltage. Additionally, the system includes a current generator configured to receive the compensation voltage and generate the adjustment current and a first current, and a signal generator configured to receive the first current and a second current. The signal generator is further configured to receive a sensing voltage and to generate a modulation signal. Moreover, the system includes the gate driver directly or indirectly coupled to the signal generator and configured to generate a drive signal based on at least information associated with the modulation signal.

28 Claims, 16 Drawing Sheets

(56) References Cited

U.S. PATENT DOCUMENTS

| | | | |
|---|---|---|---|
| 7,239,532 B1 * | 7/2007 | Hsu et al. | 363/21.12 |
| 7,777,464 B2 * | 8/2010 | Jung et al. | 323/275 |
| 7,869,229 B2 * | 1/2011 | Huynh et al. | 363/21.01 |
| 7,894,222 B2 * | 2/2011 | Djenguerian et al. | 363/95 |
| 7,911,808 B2 * | 3/2011 | Huynh et al. | 363/16 |
| 7,961,483 B2 | 6/2011 | Huynh et al. | |
| 7,990,202 B2 * | 8/2011 | Fang et al. | 327/427 |
| 8,199,532 B2 * | 6/2012 | Grande et al. | 363/21.01 |
| 8,305,776 B2 * | 11/2012 | Fang | 363/21.16 |
| 8,331,112 B2 * | 12/2012 | Huang et al. | 363/21.12 |
| 8,570,771 B2 | 10/2013 | Huang et al. | |
| 2005/0073862 A1 * | 4/2005 | Mednik et al. | 363/20 |
| 2005/0259448 A1 * | 11/2005 | Koike | 363/21.01 |
| 2007/0133234 A1 * | 6/2007 | Huynh et al. | 363/20 |
| 2007/0159856 A1 * | 7/2007 | Yang | 363/21.12 |
| 2009/0021968 A1 * | 1/2009 | Komatsu et al. | 363/126 |
| 2009/0058387 A1 * | 3/2009 | Huynh et al. | 323/282 |
| 2011/0032732 A1 * | 2/2011 | Hsu | 363/21.14 |
| 2011/0157923 A1 * | 6/2011 | Ren et al. | 363/21.12 |
| 2011/0182090 A1 * | 7/2011 | Huang | 363/26 |
| 2012/0153921 A1 * | 6/2012 | Brokaw | 323/288 |

* cited by examiner

Figure 7(c) Heavy Load

Figure 7(b) Medium Load

Figure 7(a) Light Load

Figure 8(c) Heavy Load

Figure 8(b) Medium Load

Figure 8(a) Light Load

US 9,106,142 B2

SYSTEMS AND METHODS OF PRIMARY-SIDE SENSING AND REGULATION FOR FLYBACK POWER CONVERTER WITH HIGH STABILITY

1. CROSS-REFERENCES TO RELATED APPLICATIONS

This application is a continuation of U.S. patent application Ser. No. 13/664,932, filed Oct. 31, 2012, which is a continuation of U.S. patent application Ser. No. 12/861,147, filed Aug. 23, 2010, which claims priority to Chinese Patent Application No. 201010233209.4, filed Jul. 13, 2010, all of these three applications being commonly assigned and incorporated by reference herein for all purposes.

2. BACKGROUND OF THE INVENTION

The present invention is directed to integrated circuits. More particularly, the invention provides systems and methods for primary-side sensing and regulation. Merely by way of example, the invention has been applied to a flyback power converter. But it would be recognized that the invention has a much broader range of applicability.

Primary-side sensing and regulation is widely used in flyback power converters for small power applications such as chargers. A flyback power converter often includes a primary winding and a secondary winding that is associated with the output voltage of the converter. With primary-side sensing and regulation, the output voltage usually is sensed by detecting the voltage of an auxiliary winding that is tightly coupled to the secondary winding. Since the voltage of the auxiliary winding images the output voltage that is associated with the secondary winding, the voltage sensed in the auxiliary winding can be utilized to regulate the secondary-side output voltage.

FIG. 1 is a simplified diagram showing a conventional switch-mode flyback power conversion system with primary-side sensing and regulation. The flyback power conversion system 100 includes a transformer 110, a power switch 120, a sensing resistor 130, a cable resistor 140 that represents the equivalent resistance of output cables, a sample and hold component 180, an error amplifier 182, a loop compensation network 184, a PWM/PFM signal generator 186, a logic control component 188, and a gate driver 190. Additionally, the transformer 110 includes a primary winding 112, a secondary winding 114, and an auxiliary winding 116. Also, the flyback power conversion system 100 includes resistors 170 and 172, diodes 160 and 168, and capacitors 196 and 198. For example, the loop compensation network 184 is also called a compensation network. In another example, the loop compensation network 184 includes a loop filter.

As shown in FIG. 1, the power conversion system 100 generates an output voltage 142 at an output terminal, which is received by an output load 150. In order to regulate the output voltage 142 within a desirable range, the information related to the output voltage 142 and the output load 150 needs to be extracted for control purposes. Such information can be extracted with the auxiliary winding 116 under discontinuous conduction mode (DCM).

Specifically, when the power switch 120 is closed, the energy is stored in the transformer 110. Then, when the power switch 120 is opened, the stored energy is delivered to the output terminal, and the output voltage 142 can be mapped by the auxiliary voltage 118 of the auxiliary winding 116. For example, the auxiliary voltage 118 and the output voltage 142 has the following relationship:

$$V_{aux}=n\times(V_o+V_F+I_o\times R_{eq}) \quad \text{(Equation 1)}$$

where $V_{aux}$ represents the auxiliary voltage 118, $V_o$ represents the output voltage 142, and $V_F$ represents the forward voltage of the diode 160. Additionally, $I_o$ represents the output current corresponding to the output voltage 142. The output current is also called the load current. Moreover, $R_{eq}$ represents the resistance of the output cable resistor 140. Also, n represents the turn's ratio between the auxiliary winding 116 and the secondary winding 114, and n is equal to $N_{aux}/N_{sec}$. $N_{aux}$ represents the number of turns for the auxiliary winding 116, and $N_{sec}$ represents the number of turns for the secondary winding 114.

As shown in FIG. 1, the auxiliary voltage 118 is received by a voltage divider including the resistors 170 and 172, which converts the auxiliary voltage 118 into a feedback voltage 174.

$$V_{FB}=k\times V_{aux}=k\times n\times(V_o+V_F+I_o\times R_{eq}) \quad \text{(Equation 2-1)}$$

$$k=R_2/(R_1+R_2) \quad \text{(Equation 2-2)}$$

where $V_{FB}$ represents the feedback voltage 174, and k represents the feedback coefficient. Additionally, $R_1$ and $R_2$ represent the resistance of the resistors 170 and 172 respectively.

FIG. 2 is a simplified diagram showing conventional waveforms for the feedback voltage 174 and the secondary current that flows through the secondary winding 114. As shown in FIG. 2, $V_{FB}$ and $I_{sec}$ represent the feedback voltage 174 and the secondary current respectively. Additionally, $t_{on}$ represents the time period when the power switch 120 is closed, and $t_{off}$ represents the time period when the power switch 120 is turned off. Moreover, $t_{Demag}$ represents the time period of the demagnetization process.

Referring to both FIGS. 1 and 2, the feedback voltage $V_{FB}$ is received by the sample and hold component 180. Near the end of the demagnetization process, the secondary current that flows through the secondary winding 114 becomes close to zero. At this time, the feedback voltage $V_{FB}$ is sampled, for example, at point A in FIG. 2. The sampled voltage $V_A$ is then held by the component 180 until the next sampling.

The sampled voltage $V_A$ is received by an error amplifier 182, which compares the sampled voltage $V_A$ and a reference voltage $V_{ref}$, and also amplifies the difference between $V_A$ and $V_{ref}$. The error amplifier 182, together with the compensation network 184, sends one or more output signals 185 to the PWM/PFM signal generator 186. For example, the compensation network 184 includes a capacitor. In another example, the PWM/PFM signal generator 186 also receives a sensing voltage 132 from the sensing resistor 130, which converts the primary current that flows though the primary winding 112 into the sensing voltage. In response, the PWM/PFM signal generator 186 outputs a modulation signal 187 to the logic control component 188, which sends a control signal 189 to the gate driver 190. In response, the gate driver 190 sends a drive signal 192 to the power switch 120.

Hence, as shown in FIG. 1, the output signals 185 are used to control the pulse width or the switching frequency of the drive signal 192, and thus control the output voltage 142. For example, one of the output signals 185 is associated with a compensation voltage $V_{comp}$. In another example, FIG. 3 is a simplified diagram showing the compensation voltage $V_{comp}$ as a function of the output current $I_o$, which is also called the load current.

Specifically, the negative feedback loop is used to regulate the output voltage $V_o$ by regulating the sampled voltage $V_A$ so that $V_A$ becomes equal to the reference voltage $V_{ref}$. Hence, $$V_{ref}=k \times n \times (V_o+V_F+I_o \times R_{eq})$$ (Equation 3)

Therefore, $$V_o = \frac{V_{ref}}{k \times n} - V_F - I_o \times R_{eq}$$ (Equation 4)

Since the output voltage $V_o$ is regulated by the negative feedback loop, it is often important to keep the loop stable at all input voltages for all the load conditions. Also, the feedback loop often needs to exhibit the good dynamics.

As shown in FIG. 1, for the power conversion system 100, the feedback loop includes at least the control stage and the power stage. For example, the control stage includes at least part of the error amplifier 182, the loop compensation network 184, and the PWM/PFM signal generator 186. In another example, the power stage includes at least the logic control component 188, the gate driver 190, and certain components between the gate driver 190 and the output terminal for the output voltage $V_o$.

The overall transfer function of the forward path is determined by the transfer function of the control stage and the transfer function of the power stage. For the power conversion system 100, the transfer function of the power stage is:

$$Z_{power}(s) \approx \frac{V_o}{D} \times \frac{1 + R_{esr} \times C_o \times s}{1 + \frac{R_o \times C_o}{2} \times s}$$ (Equation 5)

where $R_o$ represents the output resistance, $C_o$ represents the output capacitance, and $R_{esr}$ represents the resistance that is in series with the output capacitance. Additionally, s equals $j\omega$, and $\omega$ is the angular frequency, often simply called frequency. Moreover, D represents the duty cycle of the modulation signal 187.

Based on Equation 5, the pole location in the frequency domain for the power stage is:

$$\omega_{p1} = \frac{2}{R_o C_o}$$ (Equation 6)

Hence, for a given $C_o$, the frequency of the pole location changes with the output resistance $R_o$. Additionally, the zero location in the frequency domain for the power stage is:

$$\omega_{z1} = \frac{1}{R_{esr} C_o}$$ (Equation 7)

Usually $R_{esr}$ is very small, so $\omega_{z1}$ often is much larger than $\omega_{p1}$.

FIGS. 4 and 5 each show a simplified conventional bode plot for the power stage of the flyback power conversion system 100.

As discussed above, the power stage and the control stage are parts of the forward path of the feedback loop. The feedback loop can be characterized by stability and dynamics, both of which are often important for primary-side sensing and regulation of the flyback power conversion system.

Hence it is highly desirable to improve the techniques of primary-side sensing and regulation.

3. BRIEF SUMMARY OF THE INVENTION

The present invention is directed to integrated circuits. More particularly, the invention provides systems and methods for primary-side sensing and regulation. Merely by way of example, the invention has been applied to a flyback power converter. But it would be recognized that the invention has a much broader range of applicability.

According to one embodiment, a system for regulating an output voltage of a power conversion system includes an error amplifier coupled to a capacitor. The error amplifier is configured to receive a reference voltage, a first voltage, and an adjustment current and to generate a compensation voltage with the capacitor. The first voltage is associated with a feedback voltage. Additionally, the system includes a current generator configured to receive the compensation voltage and generate the adjustment current and a first current, and a signal generator configured to receive the first current and a second current. The signal generator is further configured to receive a sensing voltage and to generate a modulation signal. Moreover, the system includes the gate driver directly or indirectly coupled to the signal generator and configured to generate a drive signal based on at least information associated with the modulation signal, and a switch configured to receive the drive signal and affect a primary current flowing through a primary winding coupled to a secondary winding. The secondary winding is associated with an output voltage and an output current of a power conversion system, and the power conversion system includes at least the primary winding and the secondary winding. The feedback voltage depends on at least the output voltage and the output current, and the sensing voltage depends on at least the primary current. The error amplifier is characterized by at least a transconductance and further configured to change the transconductance based on at least information associated with the adjustment current, and the transconductance decreases with the decreasing output current of the power conversion system. For example, the transconductance also increases with the increasing output current of the power conversion system.

According to another embodiment, a method for regulating an output voltage of a power conversion system includes receiving a reference voltage, a first voltage, and an adjustment current by an error amplifier. The first voltage is associated with a feedback voltage. Additionally, the method includes processing information associated with the reference voltage, the first voltage and the adjustment current, generating a compensation voltage by the error amplifier coupled to a capacitor, receiving the compensation voltage, and generating the adjustment current and a first current based on at least information associated with the compensation voltage. Moreover, the method includes receiving the first current, a second current, and a sensing voltage, generating a modulation signal based on at least information associated with the first current, the second current, and the sensing voltage, processing information associated with the modulation signal, and generating a drive signal based on at least information associated with the modulation signal. Also, the method includes receiving the drive signal and affecting a primary current based on at least information associated with the drive signal. The primary current flows through a primary winding coupled to a secondary winding. The secondary winding is associated with an output voltage and an output current of a power conversion system. The feedback voltage depends on at least the output voltage and the output current, and the sensing voltage depends on at least the primary current. The error amplifier is characterized by at least a transconductance. The process for processing information associated with the reference voltage, the first voltage and the adjustment current includes changing the transconductance based on at least information associated with the adjustment current. The transconductance decreases with the decreasing output current of the power conversion system. For example, the transconductance also increases with the increasing output current of the power conversion system.

According to yet another embodiment, a system for regulating an output voltage of a power conversion system includes an error amplifier indirectly coupled to a capacitor through a first switch. The error amplifier is configured to receive a reference voltage and a first voltage and to generate a compensation voltage with the capacitor if the first switch is closed. The first voltage is associated with a feedback voltage. Additionally, the system includes the first switch coupled to at least the error amplifier and the capacitor, and a signal generator configured to receive the compensation voltage and a first current. The signal generator is further configured to receive a sensing voltage and to generate a modulation signal. Moreover, the system includes a logic control component configured to receive the modulation signal and generate a control signal based on at least information associated with the modulation signal, a gate driver configured to receive the control signal and configured to generate a drive signal based on at least information associated with the control signal, and a second switch configured to receive the drive signal and affect a primary current flowing through a primary winding coupled to a secondary winding. The secondary winding is associated with an output voltage and an output current of a power conversion system, and the power conversion system includes at least the primary winding and the secondary winding. The feedback voltage depends on at least the output voltage and the output current, and the sensing voltage depends on at least the primary current. The control signal is characterized by at least a pulse width and a switching frequency. The first switch is configured to be controlled by the control signal. Also, the first switch is closed if the control signal is at a logic high level, and the first switch is open if the control signal is at a logic low level.

According to yet another embodiment, a method for regulating an output voltage of a power conversion system includes receiving a reference voltage and a first voltage by an error amplifier. The first voltage is associated with a feedback voltage, and the error amplifier is indirectly coupled to a capacitor through a first switch. Additionally, the method includes processing information associated with the reference voltage and the first voltage, generating a compensation voltage by the error amplifier with the capacitor if the first switch is closed, receiving the compensation voltage, a first current, and a sensing voltage, and generating a modulation signal based on at least information associated with the compensation voltage, the first current, and the sensing voltage. Moreover, the method includes processing information associated with the modulation signal, generating a control signal based on at least information associated with the modulation signal, processing information associated with the control signal, generating a drive signal based on at least information associated with the control signal, and affecting a primary current based on at least information associated with the drive signal. The primary current flows through a primary winding coupled to a secondary winding. The secondary winding is associated with an output voltage and an output current of a power conversion system. The feedback voltage depends on at least the output voltage and the output current, and the sensing voltage depends on at least the primary current. The control signal is characterized by at least a pulse width and a switching frequency. The process for processing information associated with the control signal includes closing the first switch if the control signal is at a logic high level and opening the first switch if the control signal is at a logic low level.

According to yet another embodiment, a system for regulating an output voltage of a power conversion system includes an error amplifier indirectly coupled to a capacitor through a first switch. The error amplifier is configured to receive a reference voltage and a first voltage and to generate a compensation voltage with the capacitor if the first switch is closed. The first voltage is associated with a feedback voltage. Additionally, the system includes the first switch coupled to at least the error amplifier and the capacitor, and a signal generator configured to receive the compensation voltage and a first current. The signal generator is further configured to receive a sensing voltage and to generate a modulation signal. Moreover, the system includes a logic control component configured to receive the modulation signal and generate a control signal based on at least information associated with the modulation signal. Also, the system includes a one-shot generator configured to receive the control signal and sends a one-shot signal to the first switch, a gate driver configured to receive the control signal and configured to generate a drive signal based on at least information associated with the control signal, and a second switch configured to receive the drive signal and affect a primary current flowing through a primary winding coupled to a secondary winding. The secondary winding is associated with an output voltage and an output current of a power conversion system. The power conversion system includes at least the primary winding and the secondary winding. The feedback voltage depends on at least the output voltage and the output current, and the sensing voltage depends on at least the primary current. The control signal is characterized by at least a first pulse width and a first switching frequency. The one-shot signal is characterized by at least a second pulse width and a second switching frequency. The second pulse width is a constant determined by the one-shot generator, and the second switching frequency is equal to the first switching frequency. The first switch is configured to be controlled by the one-shot signal. The first switch is closed if the one-shot signal is at a logic high level, and the first switch is open if the one-shot signal is at a logic low level.

According to yet another embodiment, a method for regulating an output voltage of a power conversion system includes receiving a reference voltage and a first voltage by an error amplifier. The first voltage is associated with a feedback voltage, and the error amplifier is indirectly coupled to a capacitor through a first switch. Additionally, the method includes processing information associated with the reference voltage and the first voltage, generating a compensation voltage by the error amplifier with the capacitor if the first switch is closed, receiving the compensation voltage, a first current, and a sensing voltage, and generating a modulation signal based on at least information associated with the compensation voltage, the first current, and the sensing voltage. Moreover, the method includes processing information associated with the modulation signal, generating a control signal based on at least information associated with the modulation signal, processing information associated with the control signal, and generating a one-shot signal and a drive signal based on at least information associated with the control signal. Also, the method includes adjusting the first switch based on information associated with the one-shot signal, and affecting a primary current based on at least information associated with the drive signal, the primary current flowing through a primary winding coupled to a secondary winding. The secondary winding is associated with an output voltage and an output current of a power conversion system. The feedback voltage depends on at least the output voltage and the output current, and the sensing voltage depends on at least the primary current. The control signal is characterized by at least a first pulse width and a first switching frequency, and the one-shot signal is characterized by at least a second pulse width and a second switching frequency. The second pulse width is a constant determined by the one-shot generator, and the second switching frequency is equal to the first switching frequency. The process for adjusting the first switch based on information associated with the one-shot signal includes closing the first switch if the one-shot signal is at a logic high level and opening the first switch if the one-shot signal is at a logic low level.

Many benefits are achieved by way of the present invention over conventional techniques. Certain embodiments of the present invention provide an error amplifier with a transconductance that decreases with the deceasing output current of the power conversion system and increases with the increasing output current of the power conversion system. For example, the power conversion system includes a feedback loop that includes at least a control stage and a power stage. The zero location of the control stage is lower than the pole location of the power stage in frequency. In another example, the gain curve for the combination of the control stage and the power stage has a slope of −20 dB/dec at the location of gain equal to 0 dB. In yet another example, the power conversation system has a sufficient phase margin at the location of gain equal to 0 dB, thus ensuring the stability of the feedback loop from the full load condition to the no load condition. Some embodiments of the present invention provide a good dynamics and stability for the feedback loop under all load conditions.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 4:
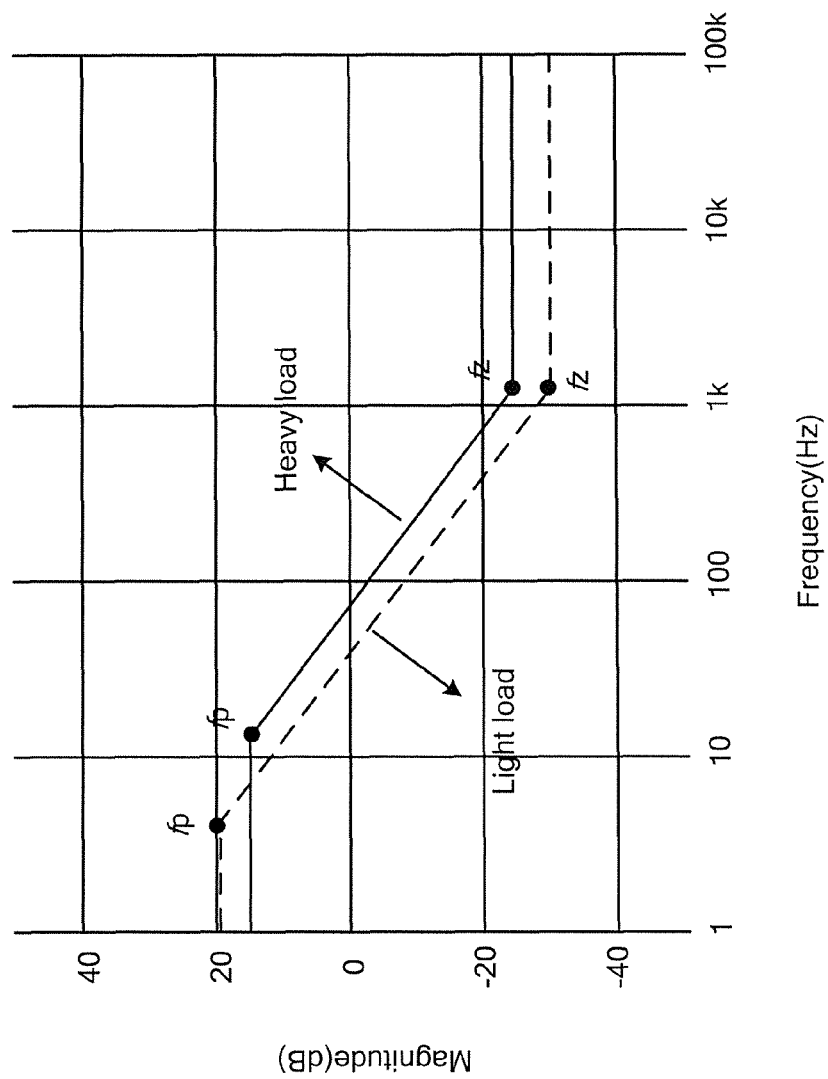
Figure 5:
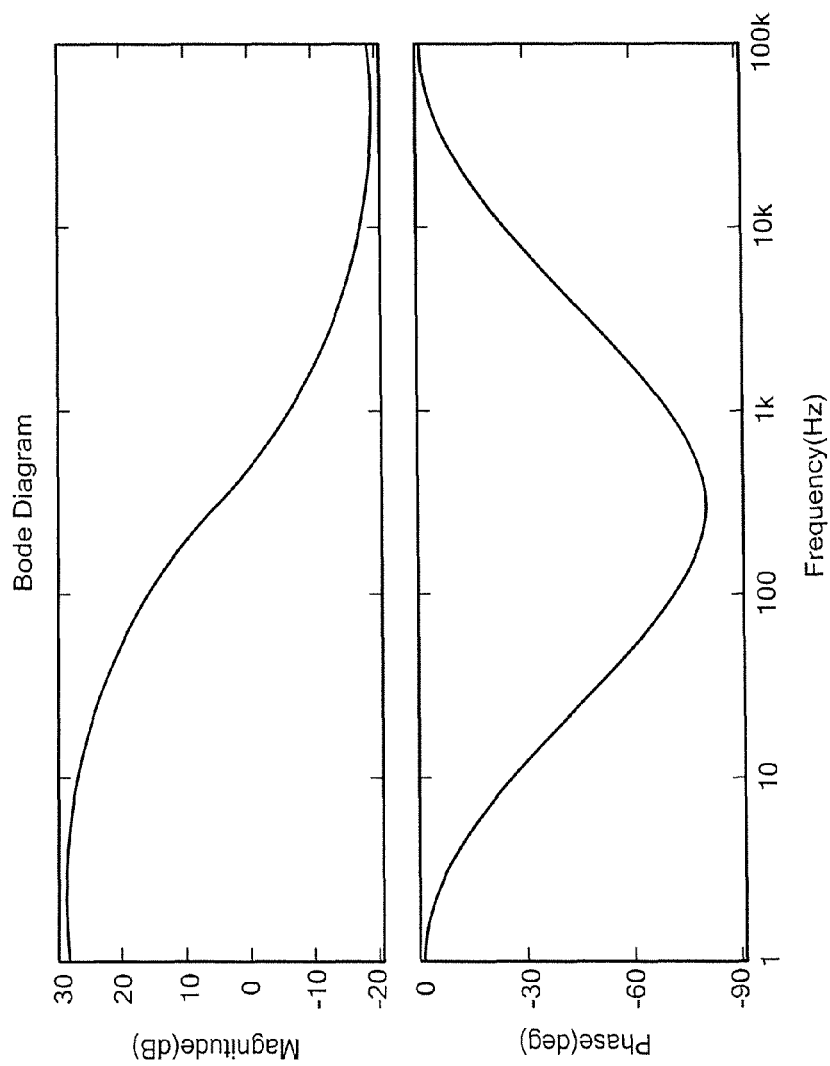

FIGS. 4 and 5 each show a simplified conventional bode plot for the power stage of the flyback power conversion system.

Figure 6:
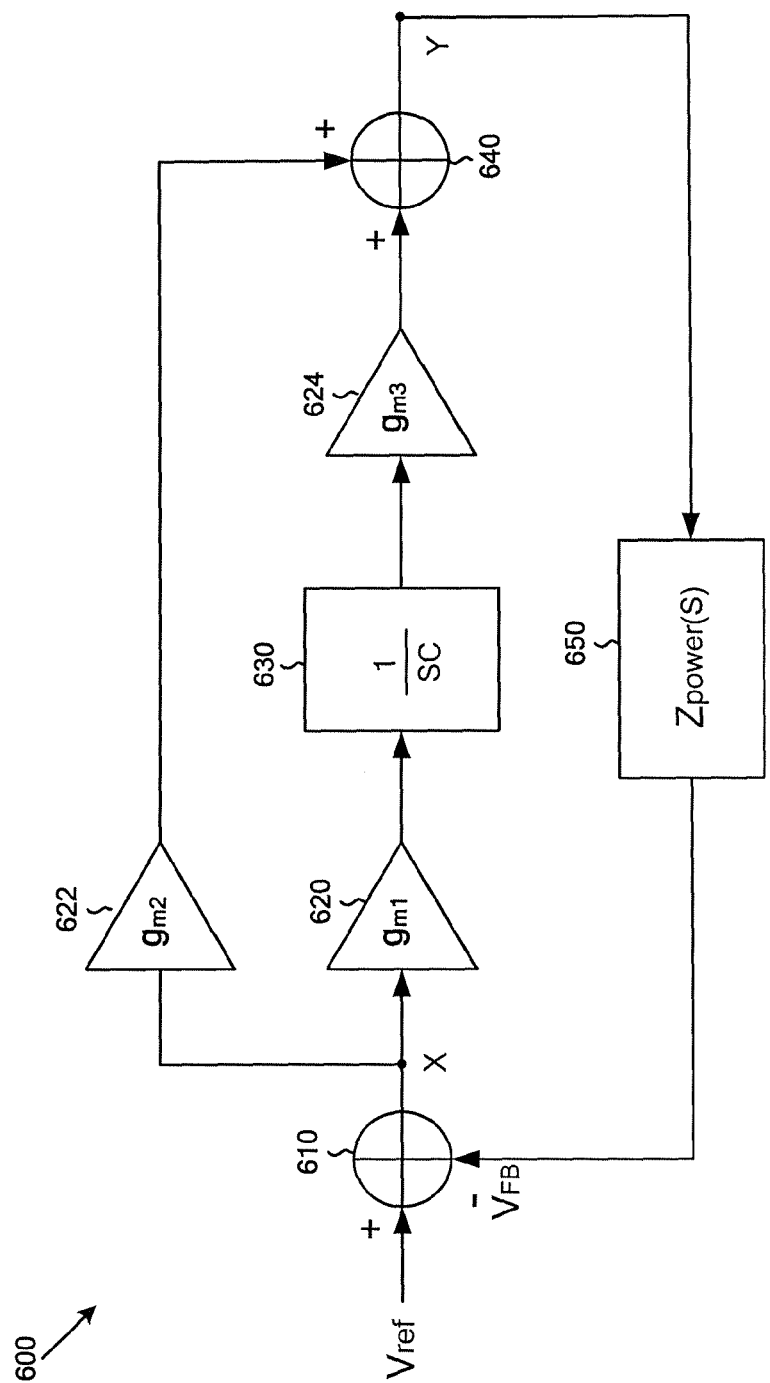

FIG. 6 is a simplified diagram showing a system of primary-side sensing and regulation for a switch-mode flyback power conversion system according to an embodiment of the present invention.

Figure 7:
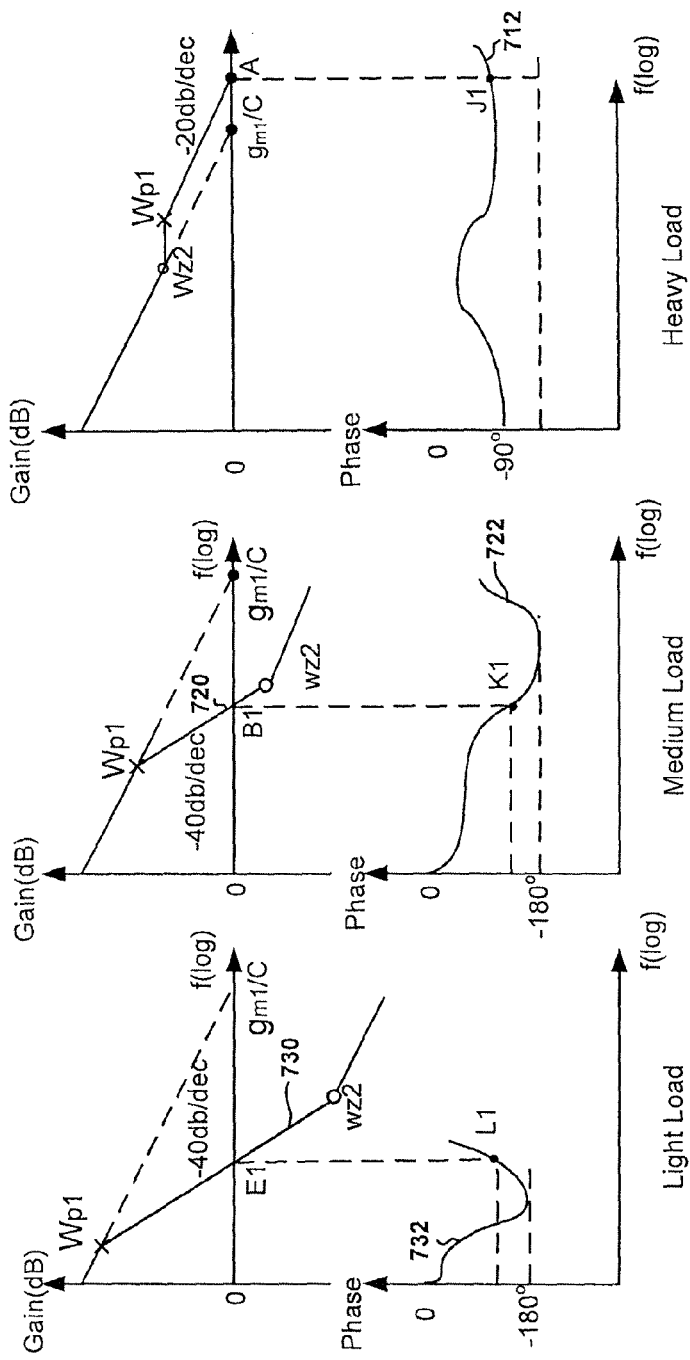

FIGS. 7(a), (b), and (c) are simplified bode plots showing a combined transfer function for the power stage and the control stage with a constant $g_{m1}$ under different load conditions.

Figure 8:
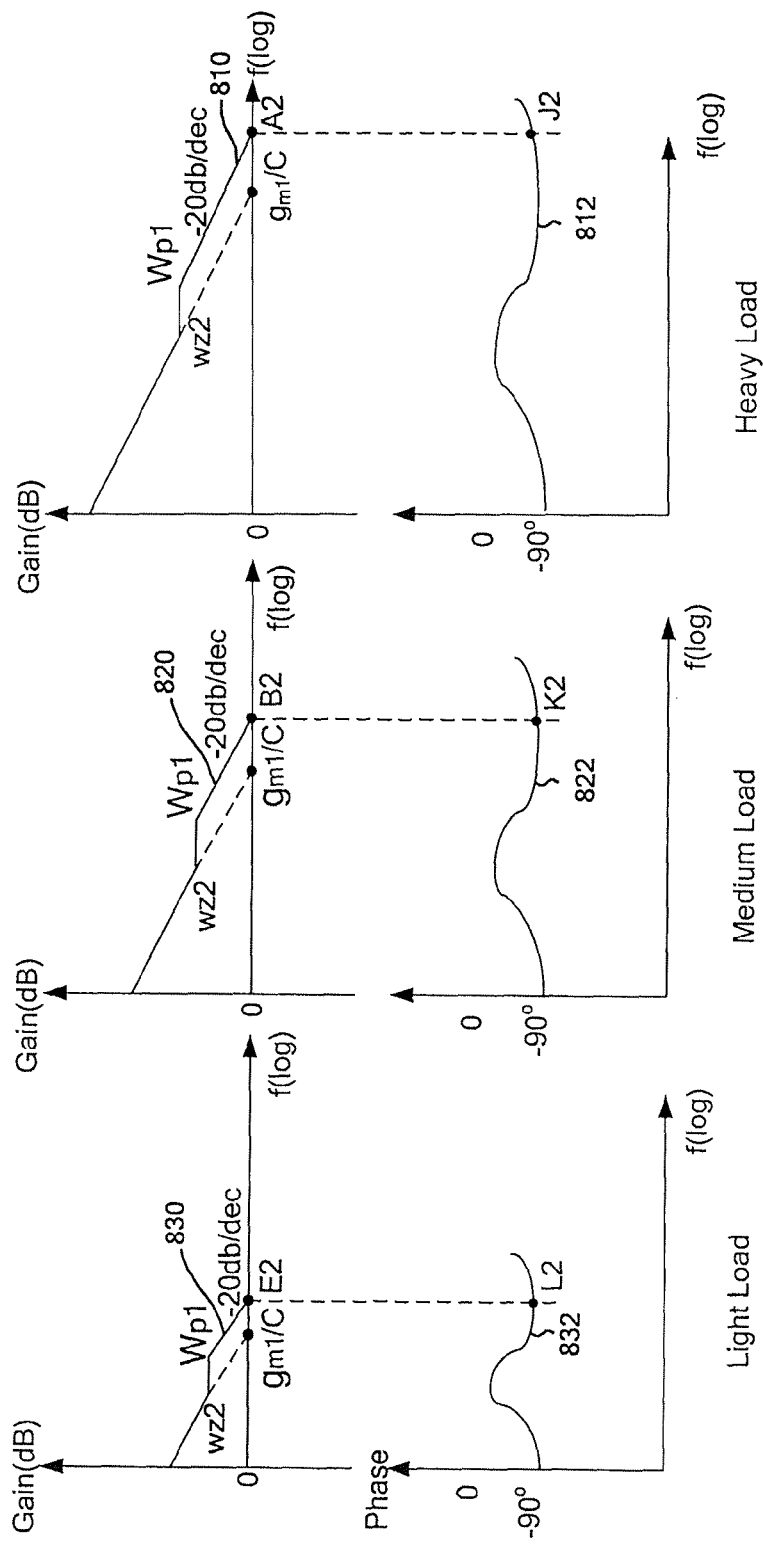

FIGS. 8(a), (b), and (c) are simplified bode plots showing a combined transfer function for the power stage and the control stage, with $g_{m1}$ decreasing with decreasing load, according to an embodiment of the present invention.

Figure 9:
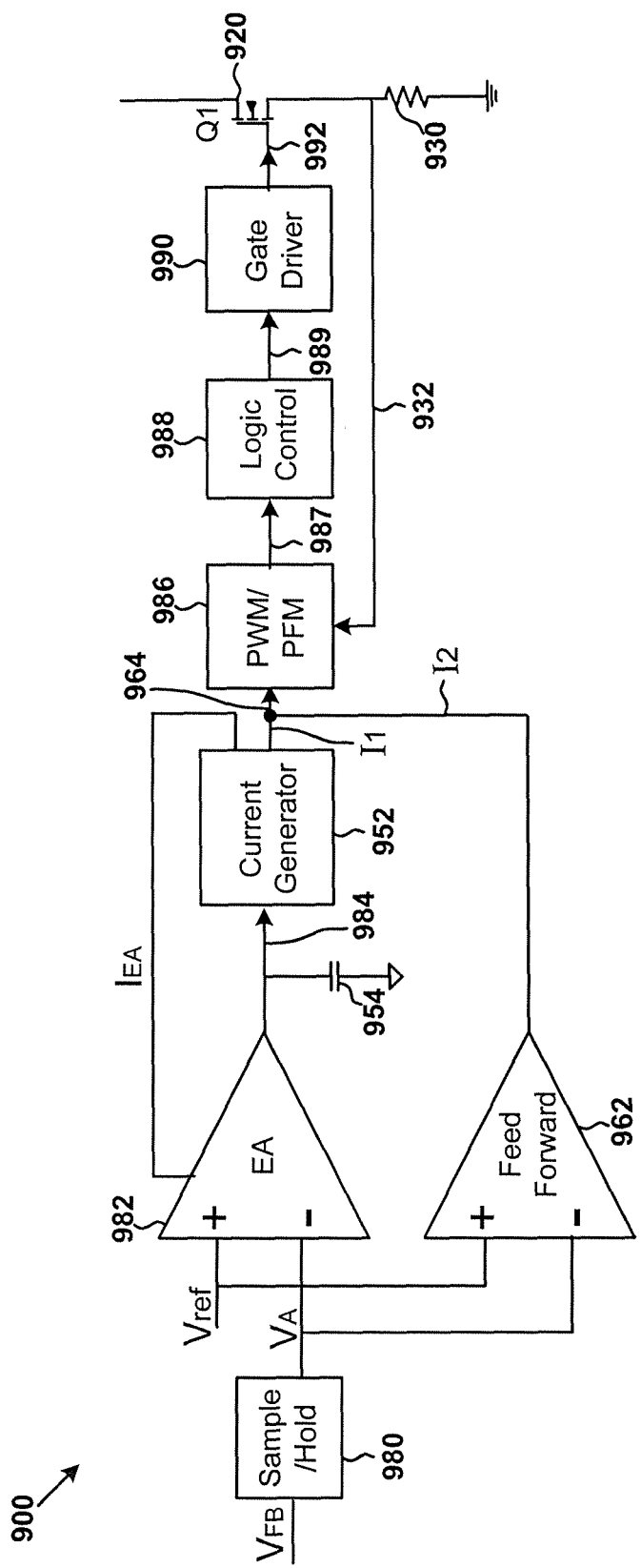

FIG. 9 is a simplified diagram showing a system of primary-side sensing and regulation for a switch-mode flyback power conversion system according to another embodiment of the present invention.

Figure 10A:
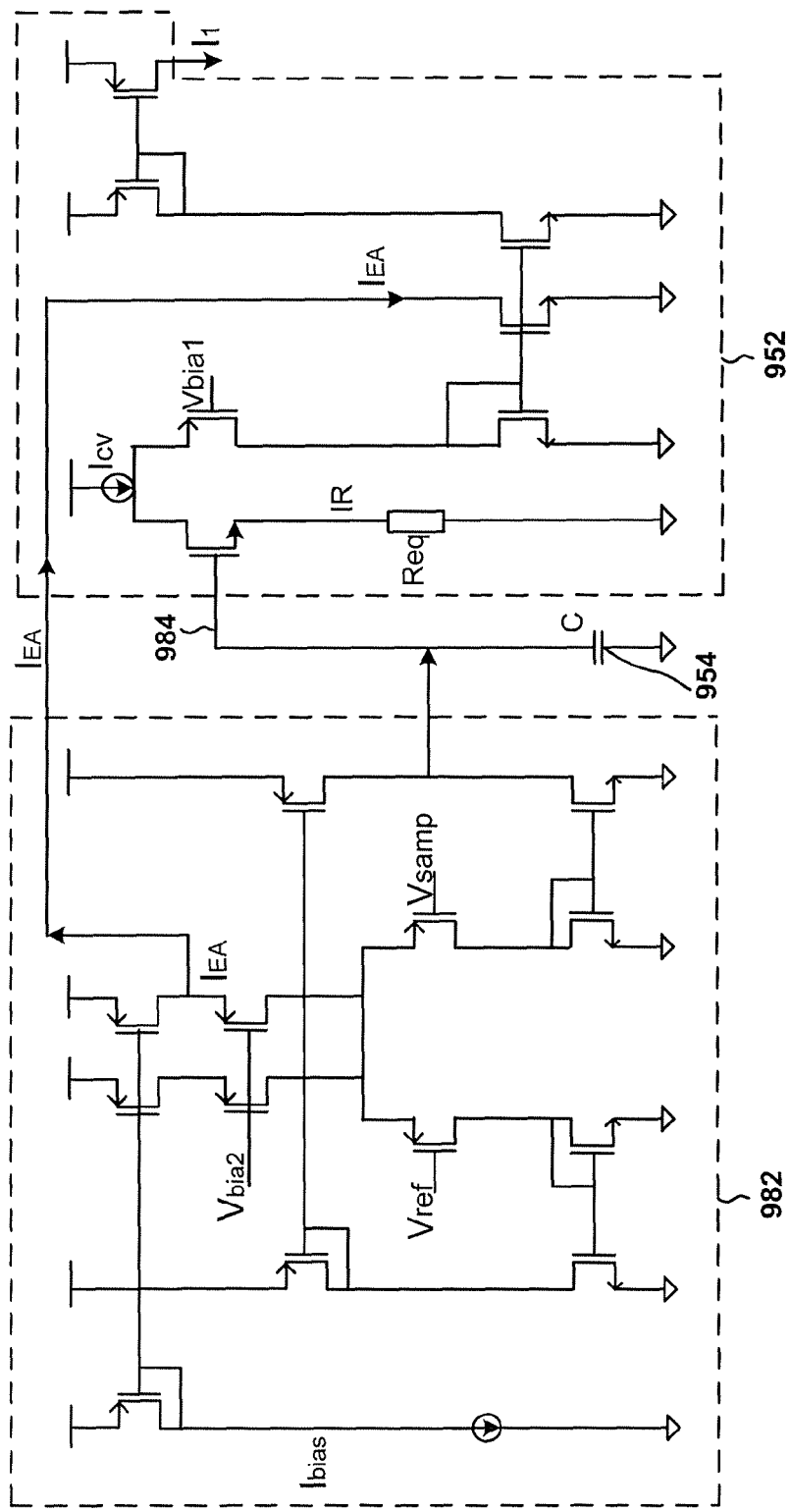

FIGS. 10(a), (b), (c), (d) each are a simplified diagram showing the error amplifier, the capacitor, and the current generator for the switch-mode flyback power conversion system according to one embodiment of the present invention.

Figure 11:
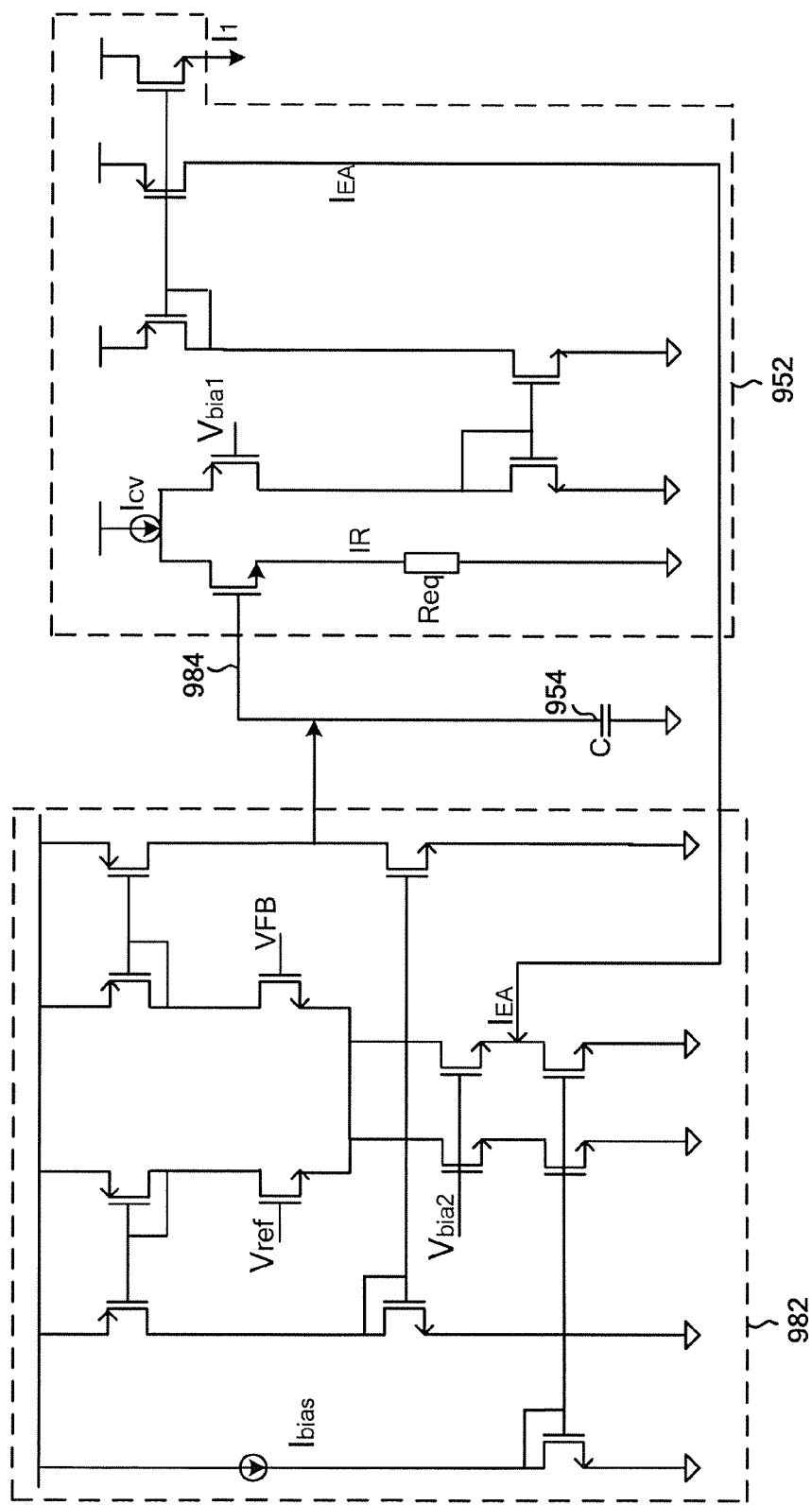

FIG. 11 is a simplified diagram showing the error amplifier, the capacitor, and the current generator for the switch-mode flyback power conversion system according to yet another embodiment of the present invention.

Figure 12:
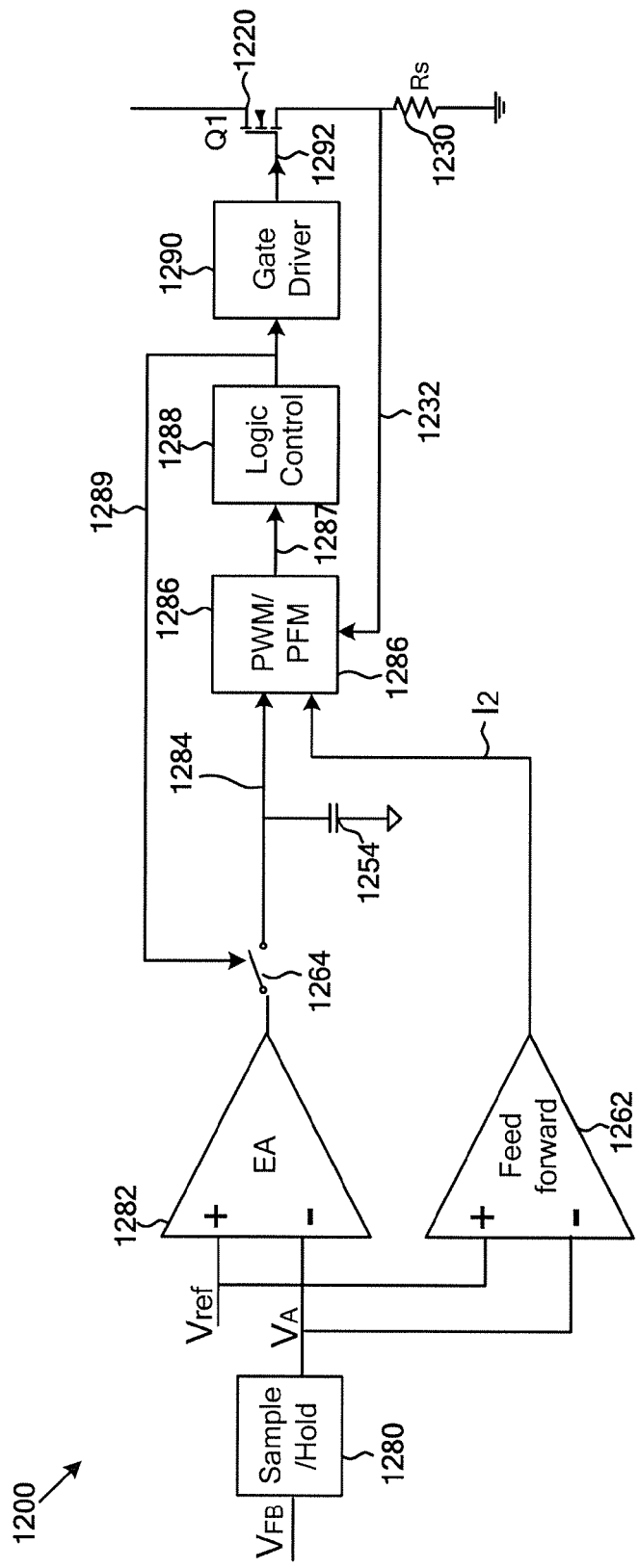

FIG. 12 is a simplified diagram showing a system of primary-side sensing and regulation for a switch-mode flyback power conversion system according to another embodiment of the present invention.

Figure 13:
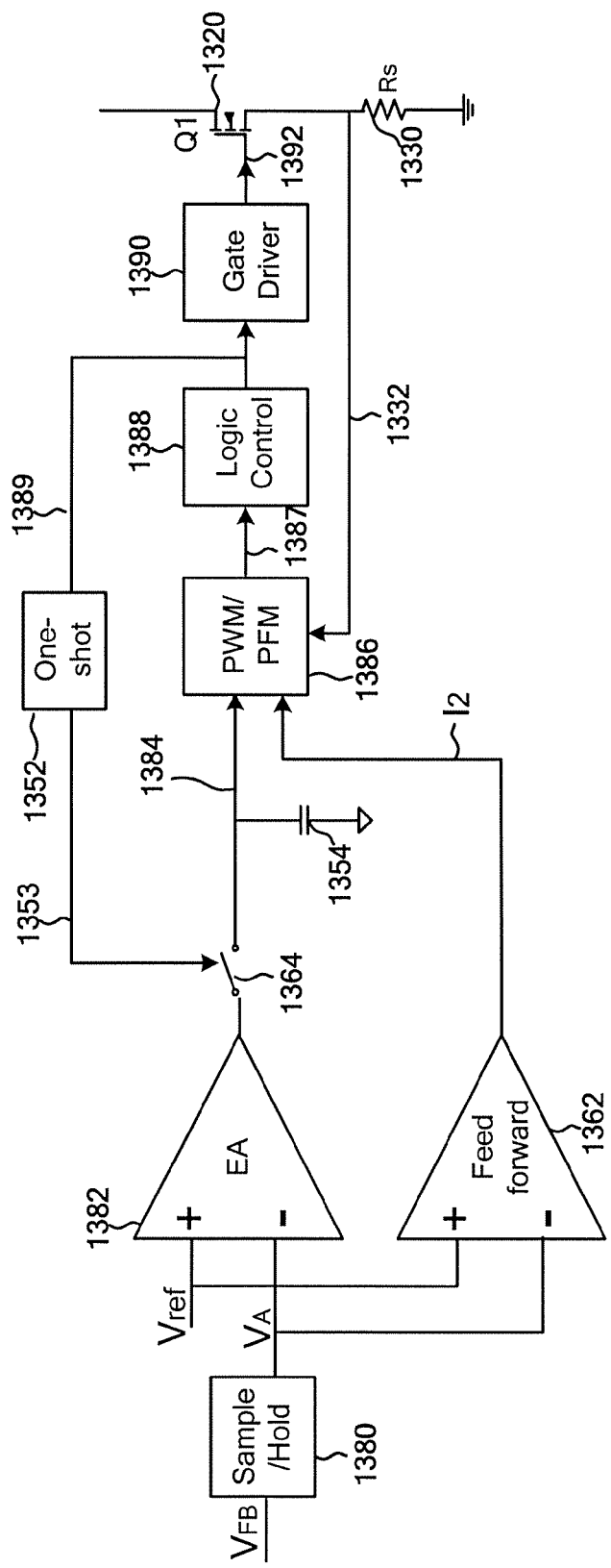

FIG. 13 is a simplified diagram showing a system of primary-side sensing and regulation for a switch-mode flyback power conversion system according to another embodiment of the present invention.

5. DETAILED DESCRIPTION OF THE INVENTION

The present invention is directed to integrated circuits. More particularly, the invention provides systems and methods for primary-side sensing and regulation. Merely by way of example, the invention has been applied to a flyback power converter. But it would be recognized that the invention has a much broader range of applicability.

FIG. 6 is a simplified diagram showing a system of primary-side sensing and regulation for a switch-mode flyback power conversion system according to an embodiment of the present invention. This diagram is merely an example, which should not unduly limit the scope of the claims. One of ordinary skill in the art would recognize many variations, alternatives, and modifications.

According to one embodiment, the system 600 for primary-side sensing and regulation includes a feedback loop with at least a power stage 650. For example, the power stage 650 has a transfer function $Z_{power}(s)$ as described in Equation 5. In another example, the power stage 650 has a pole location $\omega_p$ in the frequency domain and a zero location $\omega_z$ in the frequency domain, as described in Equations 6 and 7 respectively.

According to another embodiment, the system 600 also includes at least a control stage that includes transconductance components 620, 622, and 624, a capacitance component 630, and an addition component 640. For example, the transconductance component 620 and a subtraction component 610 are parts of an error amplifier, which belongs to the system 600. In another example, the transfer stage has the following transfer function:

$$Z_{control}(s) = \frac{Y(s)}{X(s)} \approx \frac{g_{m1} + s \times C \times g_{m2}/g_{m3}}{s \times C} \quad \text{(Equation 8)}$$

Hence, the zero location in the frequency domain for the transfer stage is:

$$\omega_{z2} = \frac{g_{m1} \times g_{m3}}{C \times g_{m2}} \quad \text{(Equation 9)}$$

FIGS. 7(a), (b), and (c) are simplified bode plots showing a combined transfer function for the power stage and the control stage with a constant $g_{m1}$ under different load conditions. Specifically, FIGS. 7(a), (b), and (c) correspond to light load, medium load, and heavy load respectively. For example, the light load, the medium load, and the heavy load are represented by a small output current $I_o$, a medium output current $I_o$, and a large output current $I_o$ respectively. In another example, the combined transfer function is equal to the transfer function of the power stage multiplied by the transfer function of the control stage.

As shown in FIG. 7(c), with heavy load, the pole location $\omega_{p1}$ is higher than the zero location $\omega_{z2}$ in frequency. Also, a gain curve 710 intercepts the horizontal axis at a point A1, with a slope of −20 dB/dec at 0 dB. The point A1 corresponds to a point J1 on a phase curve 712. Accordingly, the point J1 has a phase that is more than 90° away from −180°. Hence, the feedback loop is stable.

As shown in FIG. 7(b), with medium load, the pole location $\omega_{p1}$ is lower than the zero location $\omega_{z2}$ in frequency. Also, a gain curve 720 intercepts the horizontal axis at a point B1, with a slope of −40 dB/dec at 0 dB. The point B1 corresponds to a point K1 on a phase curve 722. Accordingly, the point K1 has a phase that is less than 90° away from −180°. Hence, the feedback loop is not stable.

Similarly, as shown in FIG. 7(a), with light load, the pole location $\omega_{p1}$ is lower than the zero location $\omega_{z2}$ in frequency. Also, a gain curve 730 intercepts the horizontal axis at a point E1, with a slope of −40 dB/dec at 0 dB. The point E1 corresponds to a point L1 on a phase curve 732. Accordingly, the point L1 has a phase that is less than 90° away from −180°. Hence, the feedback loop is not stable.

According to one embodiment, one way to improve the stability of the feedback loop is to increase the compensation capacitance C. Thus the gain curves 710, 720, and 730 intercept the horizontal axis, for example, at very low frequencies at 0 dB, keeping sufficient phase margins from −180° for all load conditions. But large compensation capacitance C may result in low loop bandwidth and thus poor dynamics.

According to another embodiment, to make the feedback loop stable, the frequency $\omega_{z2}$ of the zero location should change with the load conditions, because the frequency $\omega_{p1}$ of the pole location changes with the load conditions according to Equation 6. For example, the zero location $\omega_{z2}$ is reduced in frequency by reducing $g_{m1}$ with the decreasing load as described in Equation 9. In another example, the pole location $\omega_{p1}$ keeps being higher than the zero location $\omega_{z2}$ in frequency under all load conditions. According to yet another embodiment, the gain is also reduced with the decreasing $g_{m1}$.

FIGS. 8(a), (b), and (c) are simplified bode plots showing a combined transfer function for the power stage and the control stage, with $g_{m1}$ decreasing with decreasing load, according to an embodiment of the present invention. Specifically, FIGS. 8(a), (b), and (c) correspond to light load, medium load, and heavy load respectively. For example, the light load, the medium load, and the heavy load are represented by a small output current $I_o$, a medium output current $I_o$, and a large output current $I_o$ respectively. In another example, the combined transfer function is equal to the transfer function of the power stage multiplied by the transfer function of the control stage.

As shown in FIG. 8(c), with heavy load, the pole location $\omega_{p1}$ is higher than the zero location $\omega_{z2}$ in frequency. Also, a gain curve 810 intercepts the horizontal axis at a point A2, with for example a slope of −20 dB/dec at 0 dB. The point A2 corresponds to a point J2 on a phase curve 812. According to one embodiment, the point J2 has a phase that is more than 90° away from −180°. Hence, for example, the feedback loop is stable with heavy load.

Similarly, as shown in FIG. 8(b), with medium load, the pole location $\omega_{p1}$ is also higher than the zero location $\omega_{z2}$ in frequency. A gain curve 820 intercepts the horizontal axis at a point B2, with for example a slope of −40 dB/dec at 0 dB. The point B2 corresponds to a point K2 on a phase curve 822. Accordingly to another embodiment, the point K2 has a phase that is more than 90° away from −180°. Hence, for example, the feedback loop is stable with medium load.

Similarly, as shown in FIG. 8(a), with light load, the pole location $\omega_{p1}$ is also higher than the zero location $\omega_{z2}$ in frequency. A gain curve 830 intercepts the horizontal axis at a point E2, with for example a slope of −40 dB/dec at 0 dB. The point E2 corresponds to a point L2 on a phase curve 832. Accordingly to yet another embodiment, the point L2 has a phase that is more than 90° away from −180°. Hence, for example, the feedback loop is stable with light load.

FIG. 9 is a simplified diagram showing a system of primary-side sensing and regulation for a switch-mode flyback power conversion system according to another embodiment of the present invention. This diagram is merely an example, which should not unduly limit the scope of the claims. One of ordinary skill in the art would recognize many variations, alternatives, and modifications.

In one embodiment, the flyback power conversion system 900 includes a power switch 920, a sensing resistor 930, a sample and hold component 980, an error amplifier 982, a PWM/PFM signal generator 986, a logic control component 988, a gate driver 990, a capacitor 954, a current generator 952, and a feed forward component 962. For example, the power switch 920, the sensing resistor 930, the sample and hold component 980, the logic control component 988, and the gate driver 990 are the same as the power switch 120, the sensing resistor 130, the sample and hold component 180, the logic control component 188, and the gate driver 190 respectively. In another example, the PWM/PFM signal generator 986 is the same as the PWM/PFM signal generator 186.

Figure 1:
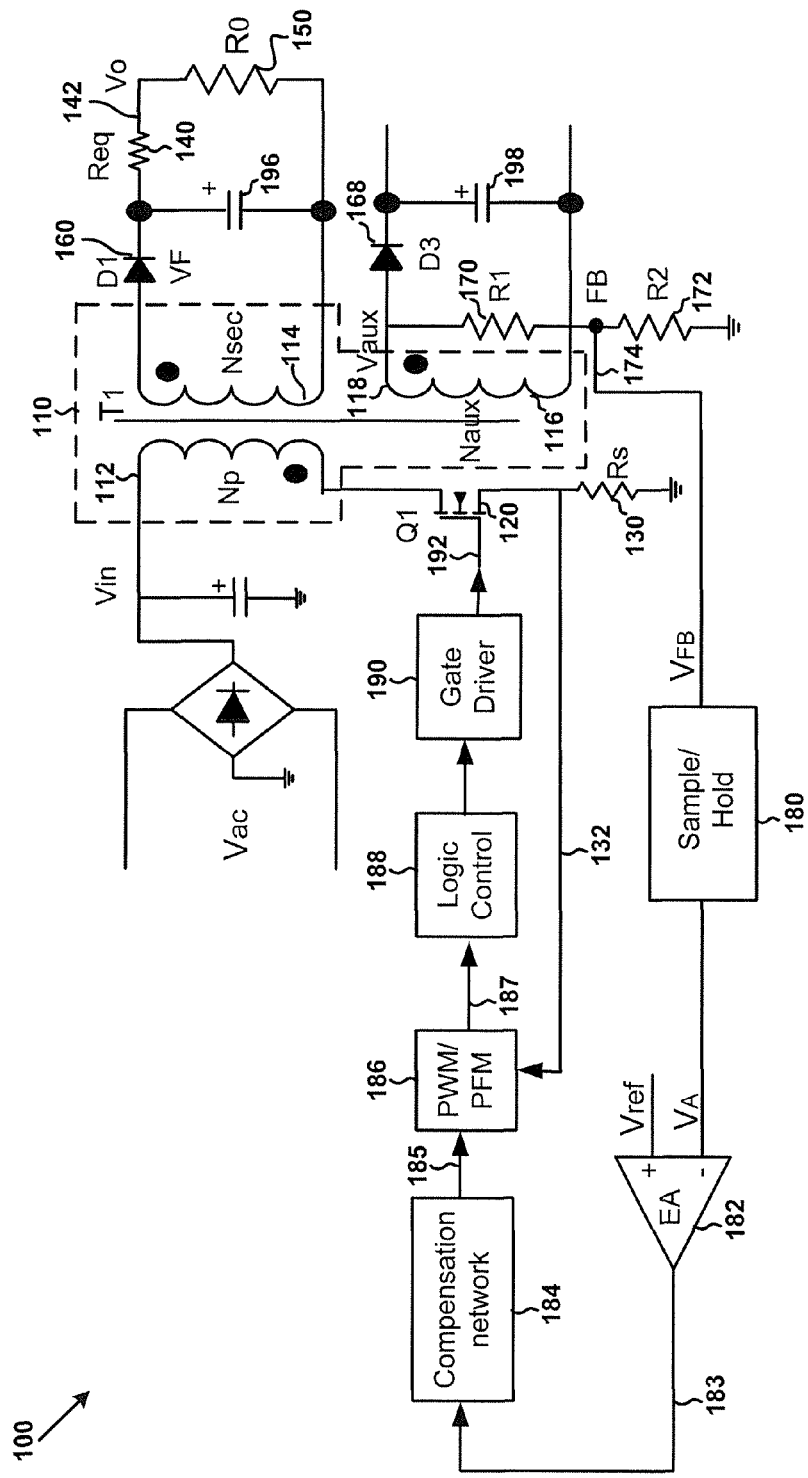
FIG. 1 is a simplified diagram showing a conventional switch-mode flyback power conversion system with primary-side sensing and regulation.
Figure 2:
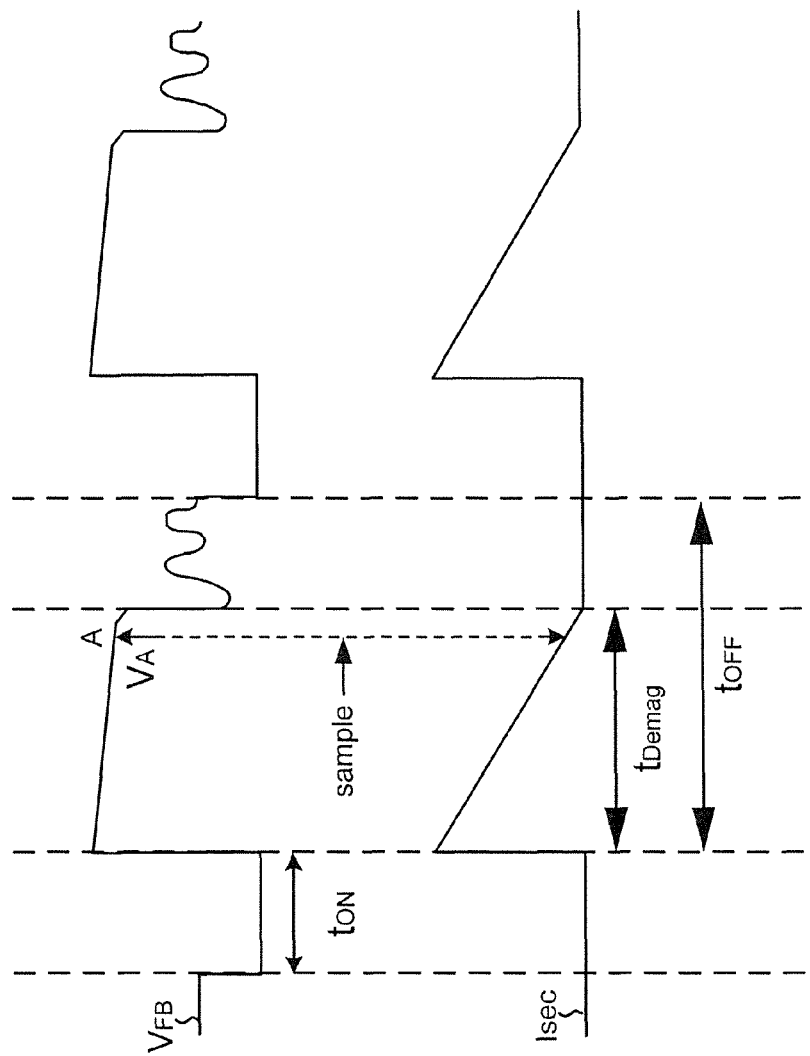
FIG. 2 is a simplified diagram showing conventional waveforms for the feedback voltage 174 and the secondary current that flows through the secondary winding 114.

In another embodiment, the flyback power conversion system 900 also includes the transformer 110, the cable resistor 140, the resistors 170 and 172, the diodes 160 and 168, the capacitors 196 and 198, all of which are shown in FIG. 1. For example, the transformer 110 includes the primary winding 112, the secondary winding 114, and the auxiliary winding 116.

As shown in FIGS. 6 and 9, the error amplifier 982 includes the subtraction component 610 and the transconductance component 620 according to one embodiment. In another embodiment, the feed forward component 962 corresponds to the transconductance component 622. In yet another embodiment, the capacitor 954 corresponds to the capacitance component 630, and the current generator 952 corresponds to the transconductance component 624. In yet another embodiment, a node 964 for adding currents $I_1$ and $I_2$ corresponds to the addition component 640.

In one embodiment, the feedback voltage $V_{FB}$ is received by the sample and hold component 980. For example, near the end of the demagnetization process when the secondary current becomes close to zero, the feedback voltage $V_{FB}$ is sampled, and the sampled voltage $V_A$ is then held by the component 980 until the next sampling. In another example, the sampled voltage $V_A$ is received by the error amplifier 982, which compares the sampled voltage $V_A$ and a reference voltage $V_{ref}$, and also amplifies the difference between $V_A$ and $V_{ref}$.

In another embodiment, the error amplifier 982, together with the capacitor 954, sends a compensation voltage 984 to the current generator 952. In response, the current generator 952 generates currents $I_{EA}$ and $I_1$. For example, the current $I_{EA}$ flows into or out of the error amplifier 982. In another example, the current $I_1$ flows into the node 964 and is added to the current $I_2$, and the sum of these two currents flows into the PWM/PFM signal generator 986.

In yet another embodiment, the current $I_2$ is generated by the feed forward component 962, which receives and processes the sampled voltage $V_A$ and the reference voltage $V_{ref}$. For example, the currents $I_1$ and $I_2$ have different phases. In yet another example, the PWM/PFM signal generator 986 also receives a sensing voltage 932 from the sensing resistor 930, which converts the primary current that flows though the primary winding 112 into the sensing voltage.

Figure 3:
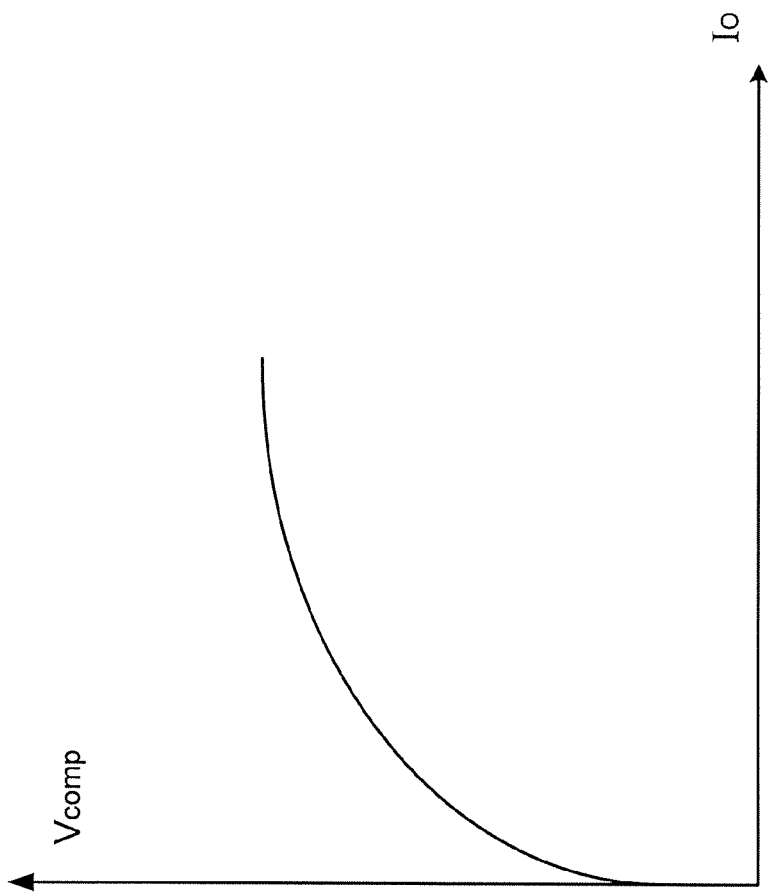
FIG. 3 is a simplified diagram showing the compensation voltage as a function of the output current, which is also called the load current.

As shown in FIG. 9, in response to the current $I_{EA}$, the error amplifier 982 changes its transconductance $g_{m1}$ according to one embodiment. For example, the compensation voltage reflects the load conditions as shown in FIG. 3. In another example, the compensation voltage is used to control the transconductance $g_{m1}$ of the error amplifier 982 through the currents $I_{EA}$.

According to one embodiment, the zero location $\omega_{z2}$ of the system 900 is reduced in frequency by reducing $g_{m1}$ with the decreasing load as described in Equation 9. For example, the gain is also reduced with the decreasing $g_{m1}$. In another example, the pole location $\omega_{p1}$ keeps being higher than the zero location $\omega_{z2}$ in frequency under all load conditions.

As shown in FIG. 9, the PWM/PFM signal generator 986 outputs a modulation signal 987 to the logic control component 988, which sends a control signal 989 to the gate driver 990. In response, the gate driver 990 sends a drive signal 992 to the power switch 920 according to one embodiment.

FIG. 10(a) is a simplified diagram showing the error amplifier 982, the capacitor 954, and the current generator 952 for the switch-mode flyback power conversion system 900 according to one embodiment of the present invention. This diagram is merely an example, which should not unduly limit the scope of the claims. One of ordinary skill in the art would recognize many variations, alternatives, and modifications.

As shown in FIG. 10(a), the error amplifier 982, together with the capacitor 954, sends a compensation voltage 984 to the current generator 952. In response, the current generator 952 generates currents $I_{EA}$ and $I_1$ according to one embodiment. For example, the current $I_{EA}$ flows out of the error amplifier 982. In yet another example, the current $I_1$ flows out of the error amplifier 982.

According to one embodiment, $I_1$ decreases with increasing $V_{comp}$, and $I_1$ increases with decreasing $V_{comp}$. According to another embodiment, the error amplifier 982 changes its transconductance $g_{m1}$ in response to the current $I_{EA}$. For example, the compensation voltage 984 decreases with the decreasing output current $I_o$. In another example, with the decreasing compensation voltage 984, the current $I_{EA}$ increases. In yet another example, as shown in FIG. 10(a), $$g_{m1} \propto \sqrt{n_a \times I_{bias} - I_{EA}}$$ (Equation 10)

where $I_{bias}$ represents a constant current generated by a current source, and $n_a$ is a constant determined by characteristics of certain components of the error amplifier 982. Based on Equation 10, $g_{m1}$ of the error amplifier 982 decreases with the increasing current $I_{EA}$ and hence with the decreasing output current $I_o$, which is also called the load current, according to one embodiment of the present invention. For example, $I_{EA}$ increases with decreasing output current and decreases with increasing output current, so $g_{m1}$ of the error amplifier 982 changes with output load conditions, thus keeping the zero location $\omega_{z2}$ lower than the pole location $\omega_{p1}$ under all load conditions.

Figure 10B:
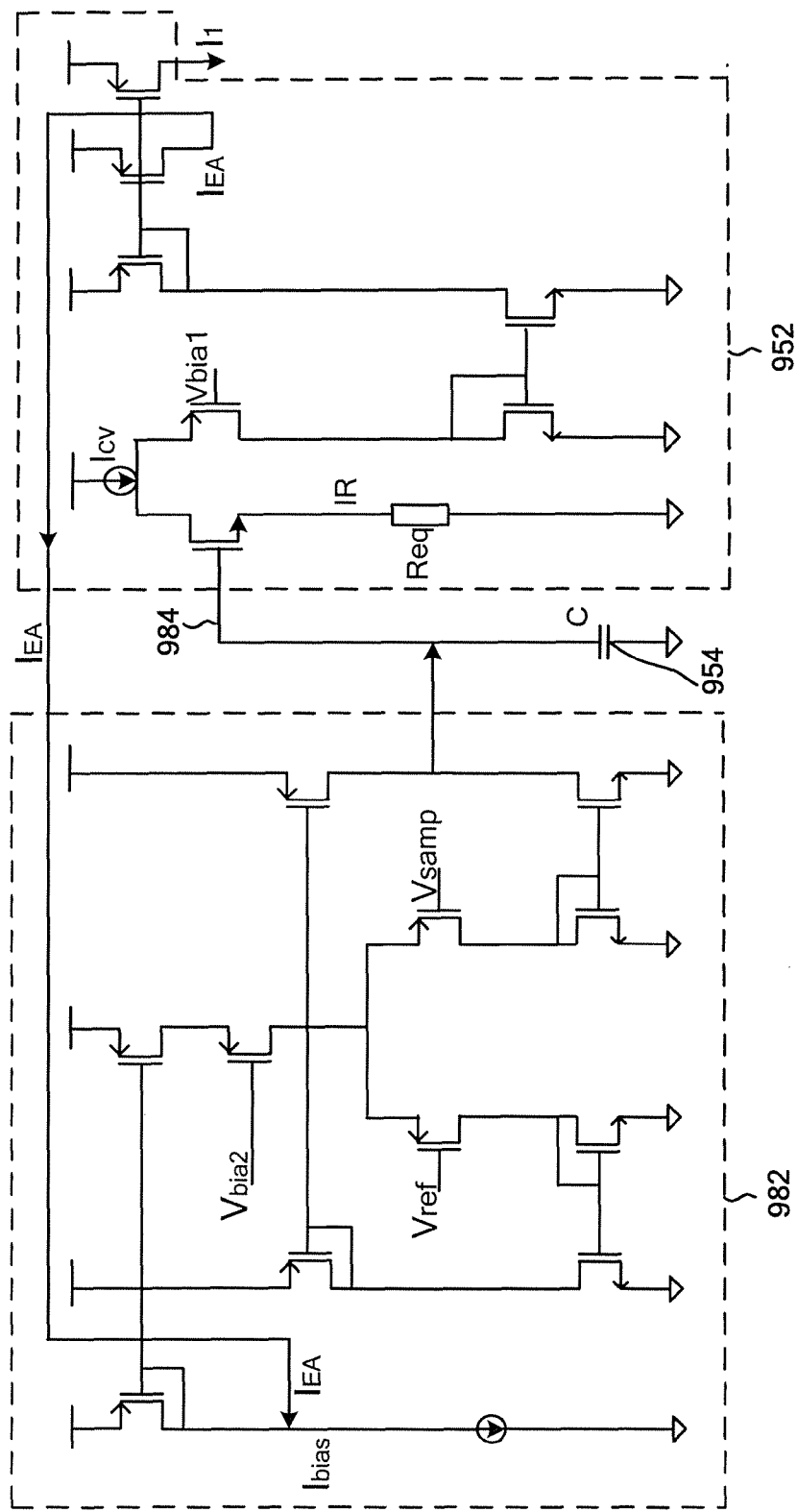

FIG. 10(b) is a simplified diagram showing the error amplifier 982, the capacitor 954, and the current generator 952 for the switch-mode flyback power conversion system 900 according to another embodiment of the present invention. This diagram is merely an example, which should not unduly limit the scope of the claims. One of ordinary skill in the art would recognize many variations, alternatives, and modifications.

As shown in FIG. 10(b), the error amplifier 982, together with the capacitor 954, sends a compensation voltage 984 to the current generator 952. In response, the current generator 952 generates currents $I_{EA}$ and $I_1$ according to one embodiment. For example, the current $I_{EA}$ flows into the error amplifier 982. In yet another example, the current $I_1$ flows out of the error amplifier 982.

According to one embodiment, $I_1$ decreases with increasing $V_{comp}$, and $I_1$ increases with decreasing $V_{comp}$. According to another embodiment, the compensation voltage 984 decreases with the decreasing output current $I_o$. For example, with the decreasing compensation voltage 984, the current $I_{EA}$ increases. In another example, as shown in FIG. 10(b), $$g_{m1} \propto \sqrt{n_b \times (I_{bias} - I_{EA})}$$ (Equation 11)

where $I_{bias}$ represents a constant current generated by a current source, and $n_b$ is a constant determined by characteristics of certain components of the error amplifier 982. Based on Equation 11, $g_{m1}$ of the error amplifier 982 decreases with the increasing current $I_{EA}$ and hence with the decreasing output current $I_o$, which is also called the load current, according to another embodiment of the present invention. For example, $I_{EA}$ increases with decreasing output current and decreases with increasing output current, so $g_{m1}$ of the error amplifier 982 changes with output load conditions, thus keeping the zero location $\omega_{z2}$ lower than the pole location $\omega_{p1}$ under all load conditions.

Figure 10C:
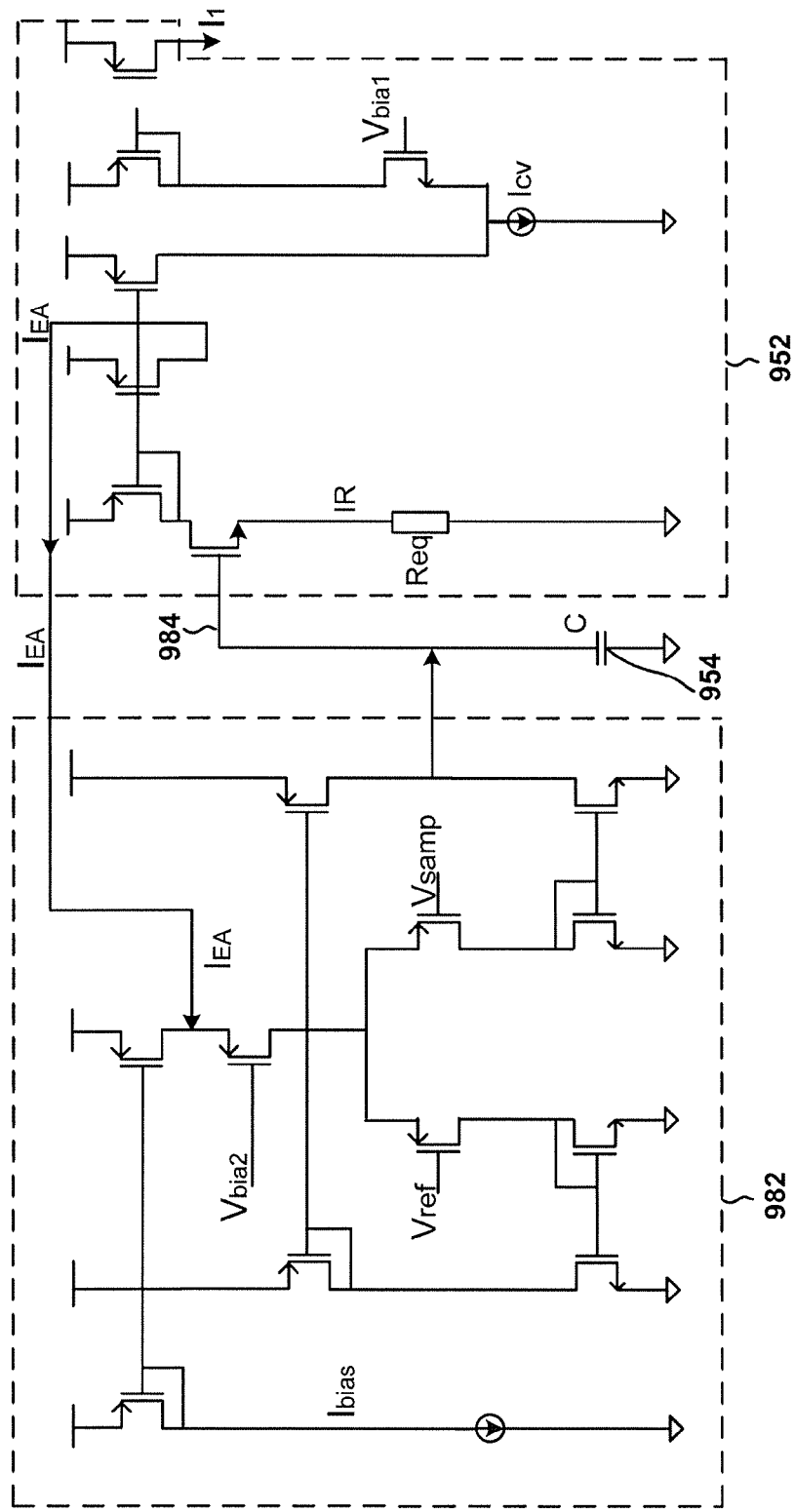

FIG. 10(c) is a simplified diagram showing the error amplifier 982, the capacitor 954, and the current generator 952 for the switch-mode flyback power conversion system 900 according to yet another embodiment of the present invention. This diagram is merely an example, which should not unduly limit the scope of the claims. One of ordinary skill in the art would recognize many variations, alternatives, and modifications.

As shown in FIG. 10(c), the error amplifier 982, together with the capacitor 954, sends a compensation voltage 984 to the current generator 952. In response, the current generator 952 generates currents $I_{EA}$ and $I_1$ according to one embodiment. For example, the current $I_{EA}$ flows into the error amplifier 982. In yet another example, the current $I_1$ flows out of the error amplifier 982.

According to one embodiment, $I_1$ decreases with increasing $V_{comp}$, and $I_1$ increases with decreasing $V_{comp}$. According to another embodiment, the compensation voltage 984 decreases with the decreasing output current $I_o$. For example, with the decreasing compensation voltage 984, the current $I_{EA}$ decreases. In another example, as shown in FIG. 10(c), $$g_{m1} \propto \sqrt{n_c \times I_{bias} + I_{EA}}$$ (Equation 12)

where $I_{bias}$ represents a constant current generated by a current source, and $n_c$ is a constant determined by characteristics of certain components of the error amplifier 982. Based on Equation 12, $g_{m1}$ of the error amplifier 982 decreases with the decreasing current $I_{EA}$ and hence with the decreasing output current $I_o$, which is also called the load current, according to yet another embodiment of the present invention. For example, $I_{EA}$ decreases with decreasing output current and increases with increasing output current, so $g_{m1}$ of the error amplifier 982 changes with output load conditions, thus keeping the zero location $\omega_{z2}$ lower than the pole location $\omega_{p1}$ under all load conditions.

Figure 10D:
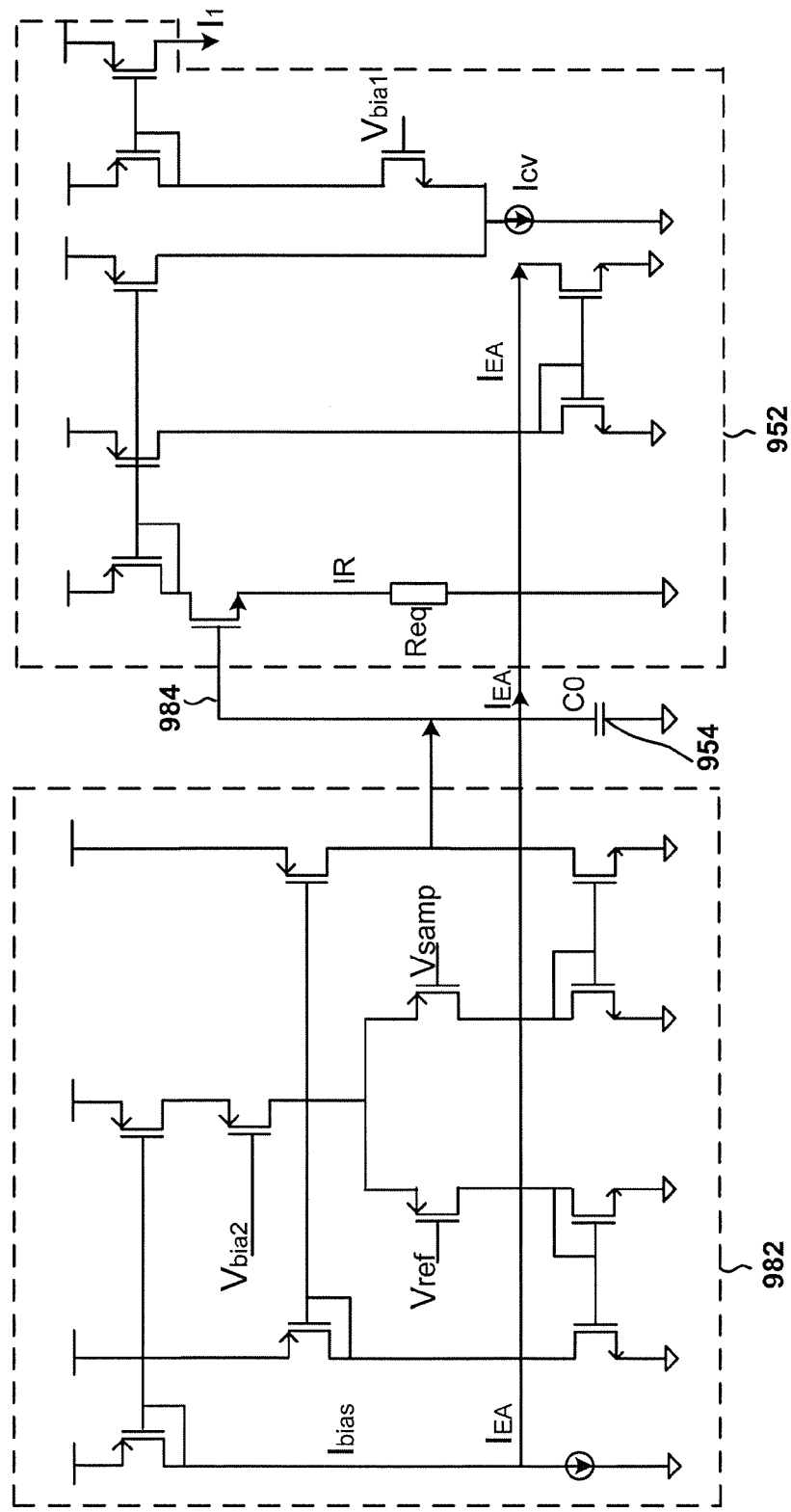

FIG. 10(d) is a simplified diagram showing the error amplifier 982, the capacitor 954, and the current generator 952 for the switch-mode flyback power conversion system 900 according to yet another embodiment of the present invention. This diagram is merely an example, which should not unduly limit the scope of the claims. One of ordinary skill in the art would recognize many variations, alternatives, and modifications.

As shown in FIG. 10(d), the error amplifier 982, together with the capacitor 954, sends a compensation voltage 984 to the current generator 952. In response, the current generator 952 generates currents $I_{EA}$ and $I_1$ according to one embodiment. For example, the current $I_{EA}$ flows out of the error amplifier 982. In yet another example, the current $I_1$ flows out of the error amplifier 982.

According to one embodiment, $I_1$ decreases with increasing $V_{comp}$, and $I_1$ increases with decreasing $V_{comp}$. According to another embodiment, the compensation voltage 984 decreases with the decreasing output current $I_o$. For example, with the decreasing compensation voltage 984, the current $I_{EA}$ decreases. In another example, as shown in FIG. 10(d), $$g_{m1} \propto \sqrt{n_d \times (I_{bias} + I_{EA})} \qquad \text{(Equation 13)}$$

where $I_{bias}$ represents a constant current generated by a current source, and $n_d$ is a constant determined by characteristics of certain components of the error amplifier 982. Based on Equation 13, $g_{m1}$ of the error amplifier 982 decreases with the decreasing current $I_{EA}$ and hence with the decreasing output current $I_o$, which is also called the load current, according to yet another embodiment of the present invention. For example, $I_{EA}$ decreases with decreasing output current and increases with increasing output current, so $g_{m1}$ of the error amplifier 982 changes with output load conditions, thus keeping the zero location $\omega_{z2}$ lower than the pole location $\omega_{p1}$ under all load conditions.

FIG. 11 is a simplified diagram showing the error amplifier 982, the capacitor 954, and the current generator 952 for the switch-mode flyback power conversion system 900 according to yet another embodiment of the present invention. This diagram is merely an example, which should not unduly limit the scope of the claims. One of ordinary skill in the art would recognize many variations, alternatives, and modifications.

As shown in FIG. 11, the error amplifier 982, together with the capacitor 954, sends a compensation voltage 984 to the current generator 952. In response, the current generator 952 generates currents $I_{EA}$ and $I_1$ according to one embodiment. For example, the current $I_{EA}$ flows out of the error amplifier 982. In yet another example, the current $I_1$ flows out of the error amplifier 982. In yet another example, the error amplifier 982 includes one or more NMOS transistors.

According to one embodiment, $I_1$ decreases with increasing $V_{comp}$, and $I_1$ increases with decreasing $V_{comp}$. According to another embodiment, the compensation voltage 984 decreases with the decreasing output current $I_o$. For example, with the decreasing compensation voltage 984, $g_{m1}$ of the error amplifier 982 decreases. In another example, $g_{m1}$ decreases with the decreasing output current $I_o$, which is also called the load current.

FIG. 12 is a simplified diagram showing a system of primary-side sensing and regulation for a switch-mode flyback power conversion system according to another embodiment of the present invention. This diagram is merely an example, which should not unduly limit the scope of the claims. One of ordinary skill in the art would recognize many variations, alternatives, and modifications.

In one embodiment, the flyback power conversion system 1200 includes a power switch 1220, a sensing resistor 1230, a sample and hold component 1280, an error amplifier 1282, a PWM/PFM signal generator 1286, a logic control component 1288, a gate driver 1290, a capacitor 1254, a feed forward component 1262, and a switch 1264. For example, the power switch 1220, the sensing resistor 1230, the sample and hold component 1280, the logic control component 1288, and the gate driver 1290 are the same as the power switch 120, the sensing resistor 130, the sample and hold component 180, the logic control component 188, and the gate driver 190 respectively. In another example, the PWM/PFM signal generator 1286 is substantially the same as the PWM/PFM signal generator 186. In yet another example, the error amplifier 1282 is the same as the error amplifier 182.

In another embodiment, the flyback power conversion system 1200 also includes the transformer 110, the cable resistor 140, the resistors 170 and 172, the diodes 160 and 168, the capacitors 196 and 198, all of which are shown in FIG. 1. For example, the transformer 110 includes the primary winding 112, the secondary winding 114, and the auxiliary winding 116.

According to one embodiment, the feedback voltage $V_{FB}$ is received by the sample and hold component 1280. For example, near the end of the demagnetization process when the secondary current becomes close to zero, the feedback voltage $V_{FB}$ is sampled, and the sampled voltage $V_A$ is then held by the component 1280 until the next sampling. In another example, the sampled voltage $V_A$ is received by the error amplifier 1282, which compares the sampled voltage $V_A$ and a reference voltage $V_{ref}$, and also amplifies the difference between $V_A$ and $V_{ref}$.

According to another embodiment, the error amplifier 1282, together with the capacitor 1254, sends a compensation voltage 1284 to the PWM/PFM signal generator 1286 if the switch 1264 is closed. For example, the PWM/PFM signal generator 1286 also receives a current $I_2$ that is generated by the feed forward component 1262. In another example, the feed forward component 1262 receives and processes the sampled voltage $V_A$ and the reference voltage $V_{ref}$. In yet another example, the compensation voltage 1284 and the current $I_2$ have different phases.

According to yet another embodiment, the PWM/PFM signal generator 1286 also receives a sensing voltage 1232 from the sensing resistor 1230, which converts the primary current that flows though the primary winding 112 into the sensing voltage. For example, the PWM/PFM converts the compensation voltage 1284 into a load compensation current and add the compensation current to the current $I_2$.

As shown in FIG. 12, the PWM/PFM signal generator 1286 outputs a modulation signal 1287 to the logic control component 1288, which sends a control signal 1289 to both the switch 1264 and the gate driver 1290. In response, the gate driver 1290 sends a drive signal 1292 to the power switch 1220 according to one embodiment. According to another embodiment, the switch 1264 is closed when the control signal 1289 is at the logic high level and is open when the control signal 1289 is at the logic low level.

For example, the switching frequency of the control signal 1289 changes with the load in the PFM mode, a light load resulting in a low switching frequency and a large load resulting in a high frequency. In another example, the pulse width of the control signal 1289 changes with the load in the PWM mode, a light load resulting in a narrow pulse width and a large load resulting in a wide pulse width. Therefore, the effective transconductance of the error amplifier 1282 changes with the load conditions according to one embodiment.

According to another embodiment, $$g_{m1\_eff} = g_{m1} \times T_{on} \times f_{sw} \quad \text{(Equation 14)}$$

where $g_{m1\_eff}$ represents the effective transconductance of the error amplifier 1282, and $g_{m1}$ represents the inherent transconductance of the error amplifier 1282. Additionally, $T_{on}$ represents the pulse width of the control signal 1289, and $f_{sw}$ represents the switching frequency of the control signal 1289.

For example, the effective transconductance changes with the output load conditions, thus keeping the zero location lower than the pole location in the frequency domain. In another example, the effective transconductance of the error amplifier 1282 becomes smaller with a lighter load (e.g., with a smaller output current $I_o$). In yet another example, the zero location $\omega_{z2}$ of the system 1200 is reduced in frequency by reducing $g_{m1\_eff}$ with the decreasing load. In one embodiment, the gain is also reduced with the decreasing $g_{m1\_eff}$. In another example, the pole location $\omega_{p1}$ keeps being higher than the zero location $\omega_{z2}$ in frequency under all load conditions.

FIG. 13 is a simplified diagram showing a system of primary-side sensing and regulation for a switch-mode flyback power conversion system according to another embodiment of the present invention. This diagram is merely an example, which should not unduly limit the scope of the claims. One of ordinary skill in the art would recognize many variations, alternatives, and modifications.

In one embodiment, the flyback power conversion system 1300 includes a power switch 1320, a sensing resistor 1330, a sample and hold component 1380, an error amplifier 1382, a PWM/PFM signal generator 1386, a logic control component 1388, a gate driver 1390, a capacitor 1354, a feed forward component 1362, a switch 1364, and a one-shot generator 1352. For example, the power switch 1320, the sensing resistor 1330, the sample and hold component 1380, the logic control component 1388, and the gate driver 1390 are the same as the power switch 120, the sensing resistor 130, the sample and hold component 180, the logic control component 188, and the gate driver 190 respectively. In another example, the PWM/PFM signal generator 1386 is substantially the same as the PWM/PFM signal generator 186. In yet another example, the error amplifier 1382 is the same as the error amplifier 182.

In another embodiment, the flyback power conversion system 1300 also includes the transformer 110, the cable resistor 140, the resistors 170 and 172, the diodes 160 and 168, the capacitors 196 and 198, all of which are shown in FIG. 1. For example, the transformer 110 includes the primary winding 112, the secondary winding 114, and the auxiliary winding 116.

According to one embodiment, the feedback voltage $V_{FB}$ is received by the sample and hold component 1380. For example, near the end of the demagnetization process when the secondary current becomes close to zero, the feedback voltage $V_{FB}$ is sampled, and the sampled voltage $V_A$ is then held by the component 1380 until the next sampling. In another example, the sampled voltage $V_A$ is received by the error amplifier 1382, which compares the sampled voltage $V_A$ and a reference voltage $V_{ref}$ and also amplifies the difference between $V_A$ and $V_{ref}$.

According to another embodiment, the error amplifier 1382, together with the capacitor 1354, sends a compensation voltage 1384 to the PWM/PFM signal generator 1386 if the switch 1364 is closed. For example, the PWM/PFM signal generator 1386 also receives a current $I_2$ that is generated by the feed forward component 1362. In another example, the feed forward component 1362 receives and processes the sampled voltage $V_A$ and the reference voltage $V_{ref}$. In yet another example, the compensation voltage 1384 and the current $I_2$ have different phases.

According to yet another embodiment, the PWM/PFM signal generator 1386 also receives a sensing voltage 1332 from the sensing resistor 1330, which converts the primary current that flows though the primary winding 112 into the sensing voltage. For example, the PWM/PFM converts the compensation voltage 1384 into a compensation current and add the compensation current to the current $I_2$.

As shown in FIG. 13, the PWM/PFM signal generator 1386 outputs a modulation signal 1387 to the logic control component 1388, which sends a control signal 1389 to both the one-shot generator 1352 and the gate driver 1390. In response, the gate driver 1390 sends a drive signal 1392 to the power switch 1320 according to one embodiment.

According to another embodiment, the one-shot generator 1352 generates a pulse with constant width that is part of signal 1353 in response to a pulse of the control signal 1389. According to yet another embodiment, the switch 1364 is closed when the control signal 1389 is at the logic high level and is open when the control signal 1389 is at the logic low level.

For example, the switching frequency of the control signal 1389 changes with the load, a light load resulting in a low switching frequency and a large load resulting in a high frequency. Therefore, the effective transconductance of the error amplifier 1382 changes with the load conditions according to one embodiment.

According to another embodiment, $$g_{m1\_eff} = g_{m1} \times T_{on\_const} \times f_{sw} \quad \text{(Equation 15)}$$

where $g_{m1\_eff}$ represents the effective transconductance of the error amplifier 1382, and $g_{m1}$ represents the inherent transconductance of the error amplifier 1382. Additionally, $T_{on\_const}$ represents the constant pulse width of the signal 1353, and $f_{sw}$ represents the switching frequency of the control signal 1389. For example, the switching frequency of the control signal 1389 is the same as the switching frequency of the signal 1353.

In another example, the effective transconductance changes with the output load conditions, thus keeping the zero location lower than the pole location in the frequency domain. In yet another example, the effective transconductance of the error amplifier 1382 becomes smaller with a lighter load (e.g., with a smaller output current $I_o$. In yet another example, the zero location $\omega_{z2}$ of the system 1300 is reduced in frequency by reducing $g_{m1\_eff}$ with the decreasing load. In one embodiment, the gain is also reduced with the decreasing $g_{m1\_eff}$. In another example, the pole location $\omega_{p1}$ keeps being higher than the zero location $\omega_{z2}$ in frequency under all load conditions.

According to another embodiment, a system for regulating an output voltage of a power conversion system includes an error amplifier coupled to a capacitor. The error amplifier is configured to receive a reference voltage, a first voltage, and an adjustment current and to generate a compensation voltage with the capacitor. The first voltage is associated with a feedback voltage. Additionally, the system includes a current generator configured to receive the compensation voltage and generate the adjustment current and a first current, and a signal generator configured to receive the first current and a second current. The signal generator is further configured to receive a sensing voltage and to generate a modulation signal. Moreover, the system includes the gate driver directly or indirectly coupled to the signal generator and configured to generate a drive signal based on at least information associated with the modulation signal, and a switch configured to receive the drive signal and affect a primary current flowing through a primary winding coupled to a secondary winding. The secondary winding is associated with an output voltage and an output current of a power conversion system, and the power conversion system includes at least the primary winding and the secondary winding. The feedback voltage depends on at least the output voltage and the output current, and the sensing voltage depends on at least the primary current. The error amplifier is characterized by at least a transconductance and further configured to change the transconductance based on at least information associated with the adjustment current, and the transconductance decreases with the decreasing output current of the power conversion system. For example, the transconductance also increases with the increasing output current of the power conversion system. In another example, the system is implemented according to FIG. 6, FIG. 9, FIG. 10(a), FIG. 10(b), FIG. 10(c), FIG. 10(d), and/or FIG. 11.

In yet another example, the system also includes a feed forward component configured to receive the reference voltage and the first voltage and generate the second current. The second current and the first current are associated with different phases. In yet another example, the system also includes a sampling and holding component configured to receive the feedback voltage, sample the feedback voltage at a predetermined time, hold the sampled voltage, and output the held voltage as the first voltage. In yet another example, the system also includes a logic control component coupled to the signal generator and the gate driver. The logic control component is configured to receive the modulation signal and output a control signal to the gate driver based on at least information associated with the modulation signal. In yet another example, the error amplifier includes a constant current source configured to generate a constant current, the adjustment current flows into or out of the error amplifier, and the transconductance of the error amplifier depends on at least the constant current and the adjustment current. In yet another example, the power conversion system comprises a feedback loop including at least a control stage and a power stage. The power stage includes at least the gate driver and one or more components between the gate driver and an output terminal for the output voltage and the output current, and the control stage includes at least a part of the error amplifier and the signal generator. In yet another example, the control stage is characterized by at least a first transfer function with at least a zero location in a frequency domain, and the power stage is characterized by at least a second transfer function with at least a pole location in the frequency domain. The feedback loop is characterized by at least a combination of the first transfer function and the second transfer function. In yet another example, the zero location is lower than the pole location in frequency regardless of the output current. In yet another example, the combination of the first transfer function and the second transfer function is associated with a gain as a first function of frequency and a phase as a second function of frequency. In yet another example, the first function of frequency has a slope of 20 dB/dec if the gain is equal to 0 dB, regardless of the output current. In yet another example, the phase is at least 90° away from −180° if the gain is equal to 0 dB, regardless of the output current.

According to yet another embodiment, a method for regulating an output voltage of a power conversion system includes receiving a reference voltage, a first voltage, and an adjustment current by an error amplifier. The first voltage is associated with a feedback voltage. Additionally, the method includes processing information associated with the reference voltage, the first voltage and the adjustment current, generating a compensation voltage by the error amplifier coupled to a capacitor, receiving the compensation voltage, and generating the adjustment current and a first current based on at least information associated with the compensation voltage. Moreover, the method includes receiving the first current, a second current, and a sensing voltage, generating a modulation signal based on at least information associated with the first current, the second current, and the sensing voltage, processing information associated with the modulation signal, and generating a drive signal based on at least information associated with the modulation signal. Also, the method includes receiving the drive signal and affecting a primary current based on at least information associated with the drive signal. The primary current flows through a primary winding coupled to a secondary winding. The secondary winding is associated with an output voltage and an output current of a power conversion system. The feedback voltage depends on at least the output voltage and the output current, and the sensing voltage depends on at least the primary current. The error amplifier is characterized by at least a transconductance. The process for processing information associated with the reference voltage, the first voltage and the adjustment current includes changing the transconductance based on at least information associated with the adjustment current. The transconductance decreases with the decreasing output current of the power conversion system. For example, the transconductance also increases with the increasing output current of the power conversion system. In another example, the method is implemented according to FIG. 6, FIG. 9, FIG. 10(a), FIG. 10(b), FIG. 10(c), FIG. 10(d), and/or FIG. 11. In yet another example, the method also includes receiving the reference voltage and the first voltage by a feed forward component, and generating the second current based on at least information associated with the reference voltage and the first voltage. The first current and the second current have at least different phases.

According to yet another embodiment, a system for regulating an output voltage of a power conversion system includes an error amplifier indirectly coupled to a capacitor through a first switch. The error amplifier is configured to receive a reference voltage and a first voltage and to generate a compensation voltage with the capacitor if the first switch is closed. The first voltage is associated with a feedback voltage. Additionally, the system includes the first switch coupled to at least the error amplifier and the capacitor, and a signal generator configured to receive the compensation voltage and a first current. The signal generator is further configured to receive a sensing voltage and to generate a modulation signal. Moreover, the system includes a logic control component configured to receive the modulation signal and generate a control signal based on at least information associated with the modulation signal, a gate driver configured to receive the control signal and configured to generate a drive signal based on at least information associated with the control signal, and a second switch configured to receive the drive signal and affect a primary current flowing through a primary winding coupled to a secondary winding. The secondary winding is associated with an output voltage and an output current of a power conversion system, and the power conversion system includes at least the primary winding and the secondary winding. The feedback voltage depends on at least the output voltage and the output current, and the sensing voltage depends on at least the primary current. The control signal is characterized by at least a pulse width and a switching frequency. The first switch is configured to be controlled by the control signal. Also, the first switch is closed if the control signal is at a logic high level, and the first switch is open if the control signal is at a logic low level. For example, the system is implemented according to FIG. 12.

In another example, the system also includes a feed forward component configured to receive the reference voltage and the first voltage and generate the first current. The first current and the compensation voltage are associated with different phases. In yet another example, the system also includes a sampling and holding component configured to receive the feedback voltage, sample the feedback voltage at a predetermined time, hold the sampled voltage, and output the held voltage as the first voltage. In yet another example, a combination of at least the error amplifier and the first switch is characterized by at least an effective transconductance. The effective transconductance depends on at least the pulse width and the switching frequency. In yet another example, the effective transconductance decreases with the decreasing output current of the power conversion system, and increases with the increasing output current of the power conversion system.

According to yet another embodiment, a method for regulating an output voltage of a power conversion system includes receiving a reference voltage and a first voltage by an error amplifier. The first voltage is associated with a feedback voltage, and the error amplifier is indirectly coupled to a capacitor through a first switch. Additionally, the method includes processing information associated with the reference voltage and the first voltage, generating a compensation voltage by the error amplifier with the capacitor if the first switch is closed, receiving the compensation voltage, a first current, and a sensing voltage, and generating a modulation signal based on at least information associated with the compensation voltage, the first current, and the sensing voltage. Moreover, the method includes processing information associated with the modulation signal, generating a control signal based on at least information associated with the modulation signal, processing information associated with the control signal, generating a drive signal based on at least information associated with the control signal, and affecting a primary current based on at least information associated with the drive signal. The primary current flows through a primary winding coupled to a secondary winding. The secondary winding is associated with an output voltage and an output current of a power conversion system. The feedback voltage depends on at least the output voltage and the output current, and the sensing voltage depends on at least the primary current. The control signal is characterized by at least a pulse width and a switching frequency. The process for processing information associated with the control signal includes closing the first switch if the control signal is at a logic high level and opening the first switch if the control signal is at a logic low level. For example, the method is implemented according to FIG. 12. In another example, the method includes receiving the reference voltage and the first voltage by a feed forward component, and generating the first current based on at least information associated with the reference voltage and the first voltage. The first current and the compensation voltage have at least different phases.

According to yet another embodiment, a system for regulating an output voltage of a power conversion system includes an error amplifier indirectly coupled to a capacitor through a first switch. The error amplifier is configured to receive a reference voltage and a first voltage and to generate a compensation voltage with the capacitor if the first switch is closed. The first voltage is associated with a feedback voltage. Additionally, the system includes the first switch coupled to at least the error amplifier and the capacitor, and a signal generator configured to receive the compensation voltage and a first current. The signal generator is further configured to receive a sensing voltage and to generate a modulation signal. Moreover, the system includes a logic control component configured to receive the modulation signal and generate a control signal based on at least information associated with the modulation signal. Also, the system includes a one-shot generator configured to receive the control signal and sends a one-shot signal to the first switch, a gate driver configured to receive the control signal and configured to generate a drive signal based on at least information associated with the control signal, and a second switch configured to receive the drive signal and affect a primary current flowing through a primary winding coupled to a secondary winding. The secondary winding is associated with an output voltage and an output current of a power conversion system. The power conversion system includes at least the primary winding and the secondary winding. The feedback voltage depends on at least the output voltage and the output current, and the sensing voltage depends on at least the primary current. The control signal is characterized by at least a first pulse width and a first switching frequency. The one-shot signal is characterized by at least a second pulse width and a second switching frequency. The second pulse width is a constant determined by the one-shot generator, and the second switching frequency is equal to the first switching frequency. The first switch is configured to be controlled by the one-shot signal. The first switch is closed if the one-shot signal is at a logic high level, and the first switch is open if the one-shot signal is at a logic low level. For example, the system is implemented according to FIG. 13.

In another example, the system also includes a feed forward component configured to receive the reference voltage and the first voltage and generate the first current. The first current and the compensation voltage are associated with different phases. In yet another example, the system also includes a sampling and holding component configured to receive the feedback voltage, sample the feedback voltage at a predetermined time, hold the sampled voltage, and output the held voltage as the first voltage. In yet another example, a combination of at least the error amplifier and the first switch is characterized by at least an effective transconductance. The effective transconductance depends on at least the first switching frequency. In yet another example, the effective transconductance decreases with the decreasing output current of the power conversion system, and increases with the increasing output current of the power conversion system.

According to yet another embodiment, a method for regulating an output voltage of a power conversion system includes receiving a reference voltage and a first voltage by an error amplifier. The first voltage is associated with a feedback voltage, and the error amplifier is indirectly coupled to a capacitor through a first switch. Additionally, the method includes processing information associated with the reference voltage and the first voltage, generating a compensation voltage by the error amplifier with the capacitor if the first switch is closed, receiving the compensation voltage, a first current, and a sensing voltage, and generating a modulation signal based on at least information associated with the compensation voltage, the first current, and the sensing voltage. Moreover, the method includes processing information associated with the modulation signal, generating a control signal based on at least information associated with the modulation signal, processing information associated with the control signal, and generating a one-shot signal and a drive signal based on at least information associated with the control signal. Also, the method includes adjusting the first switch based on information associated with the one-shot signal, and affecting a primary current based on at least information associated with the drive signal, the primary current flowing through a primary winding coupled to a secondary winding. The secondary winding is associated with an output voltage and an output current of a power conversion system. The feedback voltage depends on at least the output voltage and the output current, and the sensing voltage depends on at least the primary current. The control signal is characterized by at least a first pulse width and a first switching frequency, and the one-shot signal is characterized by at least a second pulse width and a second switching frequency. The second pulse width is a constant determined by the one-shot generator, and the second switching frequency is equal to the first switching frequency. The process for adjusting the first switch based on information associated with the one-shot signal includes closing the first switch if the one-shot signal is at a logic high level and opening the first switch if the one-shot signal is at a logic low level. For example, the method is implemented according to FIG. 13. In another example, the method includes receiving the reference voltage and the first voltage by a feed forward component, and generating the first current based on at least information associated with the reference voltage and the first voltage. The first current and the compensation voltage have at least different phases.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus comprising:
    an error amplifier configured to receive a first voltage and an adjustment current and generate a compensation voltage with a capacitor based on at least information associated with the first voltage and the adjustment current, the first voltage being associated with a feedback voltage;
    a current generator configured to receive the compensation voltage and generate the adjustment current and a first current based on at least information associated with the compensation voltage; and
    a driving component configured to receive the first current, a second current and a sensing voltage, generate a drive signal based on at least information associated with the first current, the second current and the sensing voltage, and output the drive signal to a switch in order to affect a third current flowing through a primary winding of a power conversion system;
    wherein:
        the feedback voltage is associated with an output current of the power conversion system; and
        the sensing voltage is associated with the third current;
    wherein:
        the error amplifier is characterized by a transconductance; and
        the error amplifier is further configured to change the transconductance based on at least information associated with the adjustment current so that the transconductance decreases with the decreasing output current of the power conversion system.

2. The apparatus of claim 1, and further comprising a feed forward component configured to receive a reference voltage and the first voltage and generate the second current, the second current and the first current being associated with different phases.

3. The apparatus of claim 1, and further comprising a sampling and holding component configured to receive the feedback voltage, sample the feedback voltage at a predetermined time, hold the sampled voltage, and output the held voltage as the first voltage.

4. The apparatus of claim 1 wherein:
    the error amplifier includes a current source configured to generate a fourth current;
    the adjustment current flows into or out of the error amplifier; and
    the transconductance of the error amplifier is associated with the fourth current and the adjustment current.

5. The apparatus of claim 1 wherein:
    the power conversion system includes a feedback loop including a control stage and a power stage;
    the driving component includes a signal generator, a logic control component, and a gate driver;
    the power stage includes the gate driver and one or more components between the gate driver and an output terminal for the output voltage and the output current; and
    the control stage includes a part of the error amplifier and the signal generator.

6. The apparatus of claim 5 wherein:
    the control stage is characterized by a first transfer function with a zero location in a frequency domain;
    the power stage is characterized by a second transfer function with a pole location in the frequency domain; and
    the feedback loop is characterized by a combination of the first transfer function and the second transfer function.

7. The apparatus of claim 6 wherein the zero location is lower than the pole location in frequency regardless of the output current.

8. The apparatus of claim 7 wherein the combination of the first transfer function and the second transfer function is associated with a gain as a first function of frequency and a phase as a second function of frequency.

9. The apparatus of claim 8 wherein the first function of frequency has a slope of 20 dB/dec if the gain is equal to 0 dB, regardless of the output current.

10. The apparatus of claim 9 wherein the phase is at least 90° away from −180° if the gain is equal to 0 dB, regardless of the output current.

11. A method comprising:
    receiving a first voltage and an adjustment current, the first voltage being associated with a feedback voltage;
    processing information associated with the first voltage and the adjustment current;
    generating a compensation voltage based on at least information associated with the first voltage and the adjustment current;
    receiving the compensation voltage;
    generating the adjustment current and a first current based on at least information associated with the compensation voltage;
    receiving the first current, a second current, and a sensing voltage;

generating a drive signal based on at least information associated with the first current, the second current, and the sensing voltage; and outputting the drive signal to a switch in order to affect a third current of a power conversion system;

wherein:
the feedback voltage is associated with an output current of the power conversion system; and
the sensing voltage is associated with the third current;

wherein:
an error amplifier is characterized by a transconductance;
the process for processing information associated with the first voltage and the adjustment current includes changing the transconductance based on at least information associated with the adjustment current; and
the transconductance decreases with the decreasing output current of the power conversion system.

12. The method of claim 11, the method comprising:
receiving a reference voltage and the first voltage; and
generating the second current based on at least information associated with the reference voltage and the first voltage;
wherein the first current and the second current have at least different phases.

13. An apparatus comprising:
an error amplifier configured to receive a first voltage and, in response to a first switch being closed, generate a compensation voltage with a capacitor based on at least information associated with the first voltage, the first voltage being associated with a feedback voltage;
a signal generator configured to receive the compensation voltage, a first current, and a sensing voltage and generate a first signal based on at least information associated with the compensation voltage, the first current, and the sensing voltage; and
a driving component configured to receive the first signal, generate a drive signal based on at least information associated with the first signal and output the drive signal to a second switch in order to affect a second current flowing through a primary winding of a power conversion system;
wherein:
the feedback voltage is associated with an output current of the power conversion system;
the sensing voltage is associated with the second current; and
the first switch is configured to be closed in response to the first signal being at a first logic level and be opened in response to the first signal being at a second logic level, the second logic level being different from the first logic level.

14. The apparatus of claim 13, and further comprising a feed forward component configured to receive a reference voltage and the first voltage and generate the first current, the first current and the compensation voltage being associated with different phases.

15. The apparatus of claim 13, and further comprising a sampling and holding component configured to receive the feedback voltage, sample the feedback voltage at a predetermined time, hold the sampled voltage, and output the held voltage as the first voltage.

16. The apparatus of claim 13 wherein:
a combination of the error amplifier and the first switch is characterized by an effective transconductance; and
the effective transconductance is associated with a pulse width and a switching frequency of the first signal.

17. The apparatus of claim 16 wherein the combination of the error amplifier and the first switch is configured to change the effective transconductance so that the effective transconductance decreases with the decreasing output current of the power conversion system.

18. The apparatus of claim 13 wherein the signal generator includes:
a modulation component configured to receive the compensation voltage, the first current, and the sensing voltage and to generate a modulation signal based on at least information associated with the compensation voltage, the first current, and the sensing voltage; and
a logic control component configured to receive the modulation signal and generate the first signal based on at least information associated with the modulation signal.

19. A method comprising:
receiving a first voltage associated with a feedback voltage;
processing information associated with the first voltage;
generating a compensation voltage in response to a first switch being closed;
receiving the compensation voltage, a first current, and a sensing voltage;
generating a first signal based on at least information associated with the compensation voltage, the first current, and the sensing voltage;
processing information associated with the first signal;
generating a drive signal based on at least information associated with the first signal; and
outputting the drive signal to a second switch in order to affect a second current flowing through a primary winding of a power conversion system;
wherein:
the feedback voltage is associated with an output current of the power conversion system;
the sensing voltage is associated with the second current; and
the process for processing information associated with the first signal includes closing the first switch in response to the first signal being at a first logic level and opening the first switch in response to the first signal being at a second logic level, the second logic level being different from the first logic level.

20. The method of claim 19, further comprising:
receiving a reference voltage and the first voltage; and
generating the first current based on at least information associated with the reference voltage and the first voltage;
wherein the first current and the compensation voltage have different phases.

21. An apparatus comprising:
an error amplifier configured to receive a first voltage and generate, in response to a first switch being closed, a compensation voltage with a capacitor based on at least information associated with the first voltage, the first voltage being associated with a feedback voltage;
a signal generator configured to receive the compensation voltage, a first current, and a sensing voltage and generate a first signal based on at least information associated with the compensation voltage, the first current, and the sensing voltage;
a one-shot generator configured to receive the first signal and sends a one-shot signal to the first switch; and
a driving component configured to generate a drive signal based on at least information associated with the first signal and output the drive signal to a second switch in order to affect a second current flowing through a primary winding;

wherein:
the feedback voltage is associated with an output current of a power conversion system; and
the sensing voltage is associated with at least the second current;

wherein:
the first signal is characterized by a first switching frequency;
the one-shot signal is characterized by a second switching frequency;
the second switching frequency is equal to the first switching frequency; and
the first switch is configured to be closed in response to the one-shot signal being at a first logic level and be opened in response to the one-shot signal being at a second logic level, the second logic level being different from the first logic level.

22. The apparatus of claim 21, and further comprising a feed forward component configured to receive a reference voltage and the first voltage and generate the first current, the first current and the compensation voltage being associated with different phases.

23. The apparatus of claim 21, and further comprising a sampling and holding component configured to receive the feedback voltage, sample the feedback voltage at a predetermined time, hold the sampled voltage, and output the held voltage as the first voltage.

24. The apparatus of claim 21 wherein:
a combination of the error amplifier and the first switch is characterized by an effective transconductance; and
the effective transconductance is associated with the first switching frequency.

25. The apparatus of claim 24 wherein the combination of the error amplifier and the first switch is configured to change the effective transconductance so that the effective transconductance decreases with the decreasing output current of the power conversion system.

26. The apparatus of claim 21 wherein the signal generator includes:
a modulation component configured to receive the compensation voltage, the first current, and the sensing voltage and generate a modulation signal based on at least information associated with the compensation voltage, the first current, and the sensing voltage; and
a logic control component configured to receive the modulation signal and generate the first signal based on at least information associated with the modulation signal.

27. A method comprising:
receiving a first voltage associated with a feedback voltage;
processing information associated with the first voltage;
generating a compensation voltage in response to a first switch being closed;
receiving the compensation voltage, a first current, and a sensing voltage;
generating a first signal based on at least information associated with the compensation voltage, the first current, and the sensing voltage;
processing information associated with the first signal;
generating a one-shot signal and a drive signal based on at least information associated with the first signal;
adjusting the first switch based on information associated with the one-shot signal; and
outputting the drive signal to a second switch in order to affect a second current flowing through a primary winding of a power conversion system;

wherein:
the feedback voltage is associated with an output current of the power conversion system; and
the sensing voltage is associated with the second current;

wherein:
the first signal is characterized by a first switching frequency;
the one-shot signal is characterized by a second switching frequency;
the second switching frequency is equal to the first switching frequency; and
the process for adjusting the first switch based on information associated with the one-shot signal includes closing the first switch in response to the one-shot signal being at a first logic level and opening the first switch in response to the one-shot signal being at a second logic level, the second logic level being different from the first logic level.

28. The method of claim 27, further comprising:
receiving a reference voltage and the first voltage; and
generating the first current based on at least information associated with the reference voltage and the first voltage;
wherein the first current and the compensation voltage have different phases.

* * * * *